US012710939B2

(12) United States Patent
Rowell et al.

(10) Patent No.: US 12,710,939 B2
(45) Date of Patent: Aug. 18, 2026

(54) SYSTEM AND METHOD FOR DEVELOPING USER INTERFACE APPLICATIONS

(71) Applicant: WORKDAY, INC., Pleasanton, CA (US)

(72) Inventors: Eric Don Rowell, Livermore, CA (US); Daniel Sol Eun, San Francisco, CA (US)

(73) Assignee: WORKDAY, INC., Pleasanton, CA (US)

( * ) Notice: Subject to any disclaimer, the term of this patent is extended or adjusted under 35 U.S.C. 154(b) by 86 days.

(21) Appl. No.: 18/663,592

(22) Filed: May 14, 2024

(65) Prior Publication Data

US 2024/0296029 A1 Sep. 5, 2024

Related U.S. Application Data

(63) Continuation of application No. 17/548,430, filed on Dec. 10, 2021, now Pat. No. 12,014,158.

(60) Provisional application No. 63/124,628, filed on Dec. 11, 2020.

(51) Int. Cl.
*G06F 3/048* (2013.01)
*G06F 8/38* (2018.01)
*G06F 8/61* (2018.01)
*G06F 11/3698* (2025.01)

(52) U.S. Cl.
CPC .................. *G06F 8/38* (2013.01); *G06F 8/63* (2013.01); *G06F 11/3698* (2025.01)

(58) Field of Classification Search
CPC .......... G06F 8/38; G06F 8/63; G06F 11/3664; G06F 11/3636; G06F 8/34
See application file for complete search history.

(56) References Cited

U.S. PATENT DOCUMENTS 7,451,403 B1 11/2008 Srinivasan et al.
11,500,628 B1 * 11/2022 Chawda .................... G06F 8/77
2001/0005852 A1 * 6/2001 Bogle ................. G06F 11/3698 714/E11.21
2002/0053070 A1 * 5/2002 Seki ........................ G06F 9/465 717/107
2003/0208743 A1 * 11/2003 Chong ...................... G06F 8/30 717/106

(Continued)

FOREIGN PATENT DOCUMENTS

CN 111198849 A * 5/2020 ............. G06F 16/13
WO 2017053434 A1 3/2017

OTHER PUBLICATIONS

International Preliminary Report on Patentability for PCT/US2021/062957, mailed Jun. 22, 2022, 15 pgs.

(Continued)

*Primary Examiner* — Rashawn N Tillery
(74) *Attorney, Agent, or Firm* — James J. DeCarlo; Greenberg Traurig, LLP

(57) ABSTRACT

A computer-implemented method for designing a user interface application uses a visual flow language and a model view flow architecture. The visual flow language may include components, where components include blocks and nodes. Call streams and data flows may be defined by a user. An application flow logic graph is generated. The application flow logic graph may be used to generate a user interface application.

20 Claims, 23 Drawing Sheets

(56) References Cited

U.S. PATENT DOCUMENTS

2007/0149036 A1* 6/2007 Misovski .................. G06F 8/38 439/419
2007/0150936 A1* 6/2007 Maes ...................... H04L 67/10 726/1
2010/0107136 A1* 4/2010 Fildebrandt ............... G06F 8/20 717/105
2010/0235815 A1* 9/2010 Maybee .............. G06F 11/3698 717/125
2010/0313181 A1* 12/2010 Fernandez ................ G06F 8/20 717/109
2012/0166977 A1* 6/2012 Demant .................... G06F 8/38 715/762
2014/0026084 A1 1/2014 Gilboa
2015/0135160 A1 5/2015 Gauvin et al.
2016/0291942 A1* 10/2016 Hutchison ............... G06F 8/311
2017/0048253 A1* 2/2017 Anton ..................... H04L 63/20
2017/0102943 A1* 4/2017 Voellmy .................. H04L 45/56
2017/0315713 A1* 11/2017 Pennell ................... G06F 9/451
2018/0146069 A1* 5/2018 Du ...................... H04L 67/1008
2020/0193221 A1* 6/2020 Aftab ....................... G06N 3/08
2020/0319856 A1* 10/2020 Loria .................. G06F 9/45558
2021/0055944 A1* 2/2021 Hinton ................ G06F 16/9024
2022/0197607 A1* 6/2022 Rowell ............... G06F 11/3698
2024/0394021 A1* 11/2024 Bhargava .................. G06F 8/36

OTHER PUBLICATIONS

International Search Report and Written Opinion for PCT/US2021/062957, mailed Mar. 1, 2022, 15 pgs.
Supplementary European Search Report issued in corresponding EP Appln. No. 21904527, mailed Sep. 18, 2024 (10 pages).

* cited by examiner

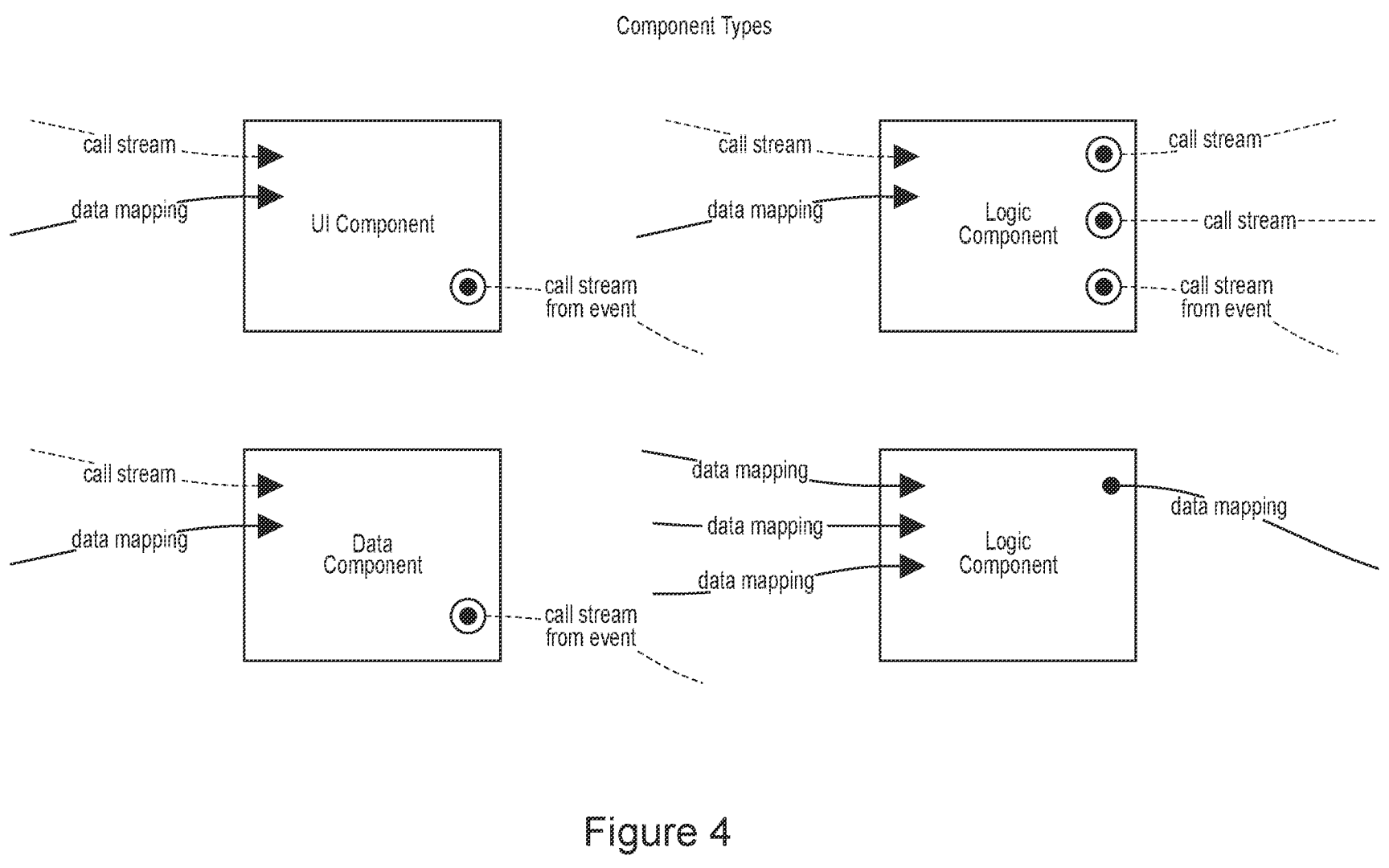

Component Types call stream
data mapping
Ui Component
call stream
from event call stream
data mapping
Logic
Component
call stream
call stream
call stream
from event call stream
data mapping
Data
Component
call stream
from event data mapping
data mapping
data mapping
Logic
Component
data mapping

Figure 4

Node Type Visual Treatments

Figure 8A:
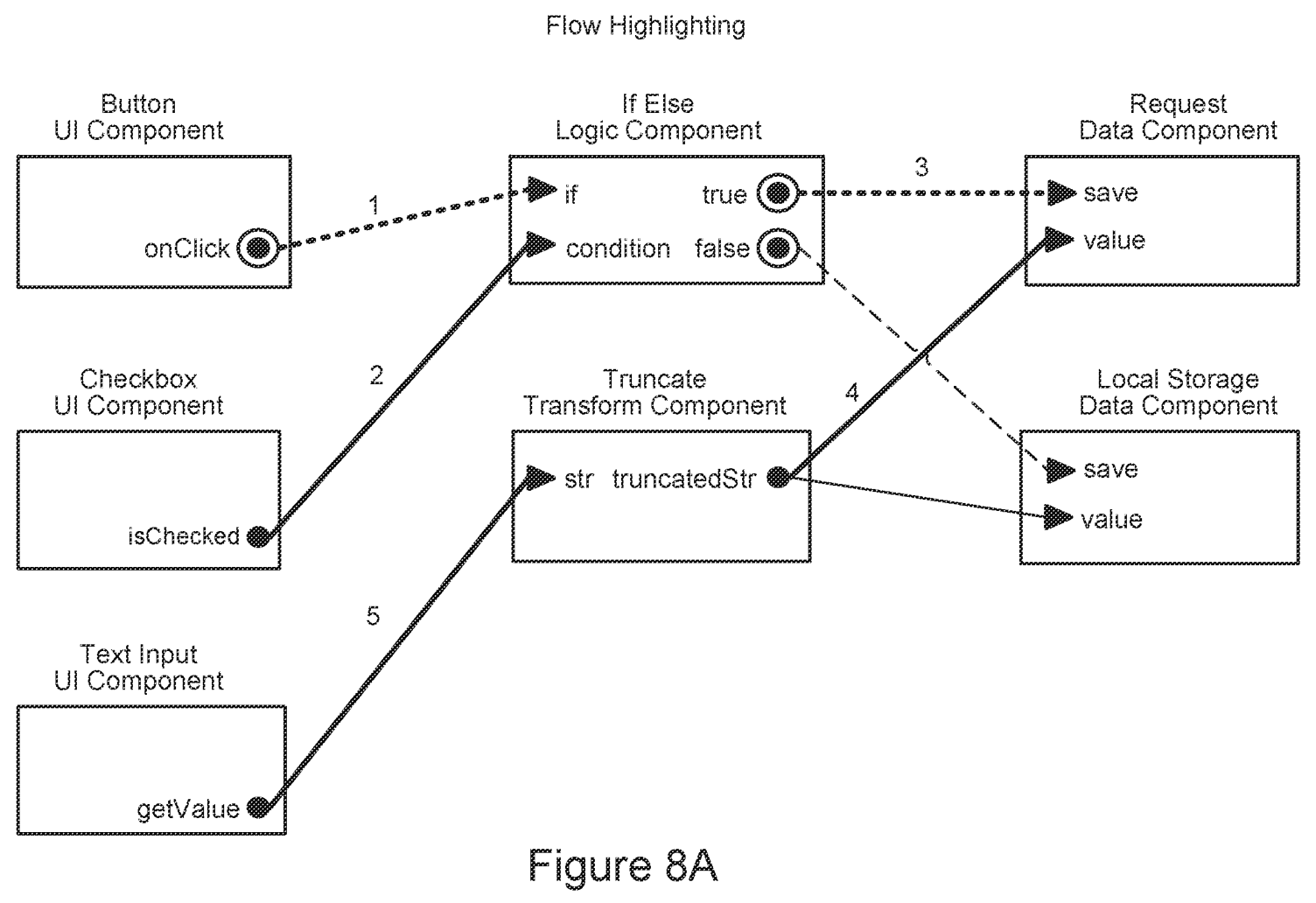

Flow Highlighting

Button
UI Component
onClick

Checkbox
UI Component
isChecked

Text Input
UI Component
getValue

1

2

5

If Else
Logic Component
if
condition
true
false

Truncate
Transform Component
str
truncatedStr

3

4

Request
Data Component
save
value

Local Storage
Data Component
save
value

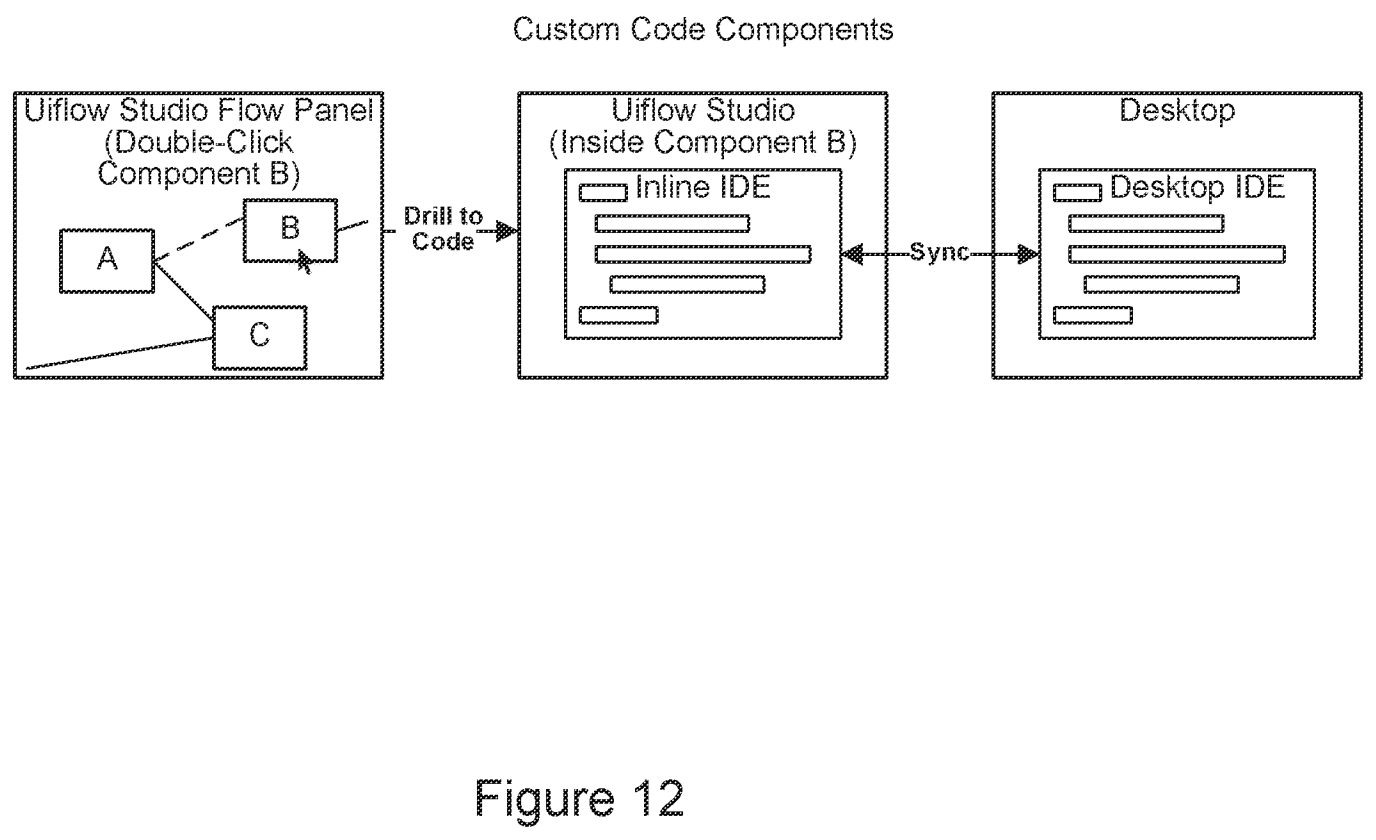

Custom Code Components

Uflow Studio Flow Panel (Double-Click Component B)

A

B

C

Drill to Code

Uflow Studio (Inside Component B)

Inline IDE

Sync

Desktop

Desktop IDE

Figure 12

SYSTEM AND METHOD FOR DEVELOPING USER INTERFACE APPLICATIONS

CROSS-REFERENCE TO RELATED APPLICATIONS

This application claims priority to U.S. application Ser. No. 17/548,430, filed Dec. 10, 2021, which claims priority to U.S. Provisional Application Ser. No. 63/124,628, filed Dec. 11, 2020, which are both hereby incorporated herein in their entirety by this reference.

FIELD OF THE INVENTION

The present disclosure generally relates to building user interfaces for enterprise applications. More particularly, the present invention is directed to an architecture and visual flow language for designing and implementing user interface applications.

BACKGROUND

User interface design for enterprise applications conventionally required a knowledge of coding to build secure and scalable frontend apps using a company's data, User Interface (UI), and integrations. Conventional tools such as model-view-controller (MVC), model-view-presenter (MVP), and model view viewModel (MVVM) have severe limitations.

Embodiments of the present disclosure were developed in view of the above-described problems.

SUMMARY

The present disclosure relates to systems and methods for designing and deploying a user interface application. In one embodiment, a design studio is provided to design applications using a visual flow language. The visual flow language includes a plurality of different component types, where each component has at least one block, wherein a block includes at least one node. Users may form call stream connections and data mappings between nodes. Each component may encapsulate its own corresponding model. An application logic flow graph may be generated based on the user selections to define a user interface application.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 4 illustrates examples of component types in accordance with an implementation.

FIG. 8A illustrates examples of flows and flow highlighting between components in accordance with an implementation.

FIG. 11D illustrates an example of a catalog panel.

FIG. 11E illustrates an example of an inspector panel.

FIG. 12 illustrates generation of custom code components in accordance with an implementation.

DETAILED DESCRIPTION

Architecture Overview

A system and method for designing user interface applications without having to code software is disclosed. It includes a Model View Flow (MVF) architecture that includes a Visual Flow Language (VFL or Flowlang) for developing software applications. Flowlang is a visual language built on top of MVF that enables application builders (users) to build applications in a no-code way. It is not absolutely required to use a visual language to build an application with a MVF architecture. Applications could also be built in a traditional (text code) way. However, Flowlang makes it easy to build applications.

MVF models application logic and state through UI streams that originate with an event from a component and complete by calling methods of one or more other components. In MVF, the method parameters are obtained via data mapping to other stateful components. An aspect of MVF is that data mapping supports complicated application flows. This provides benefits, such as allowing the software design pattern to be Turing complete, and allowing fully non-linear execution of logic which mimics modern programming languages. MVF applications can be authored visually, although more generally they could also be authored textually in code.

Figure 1A:
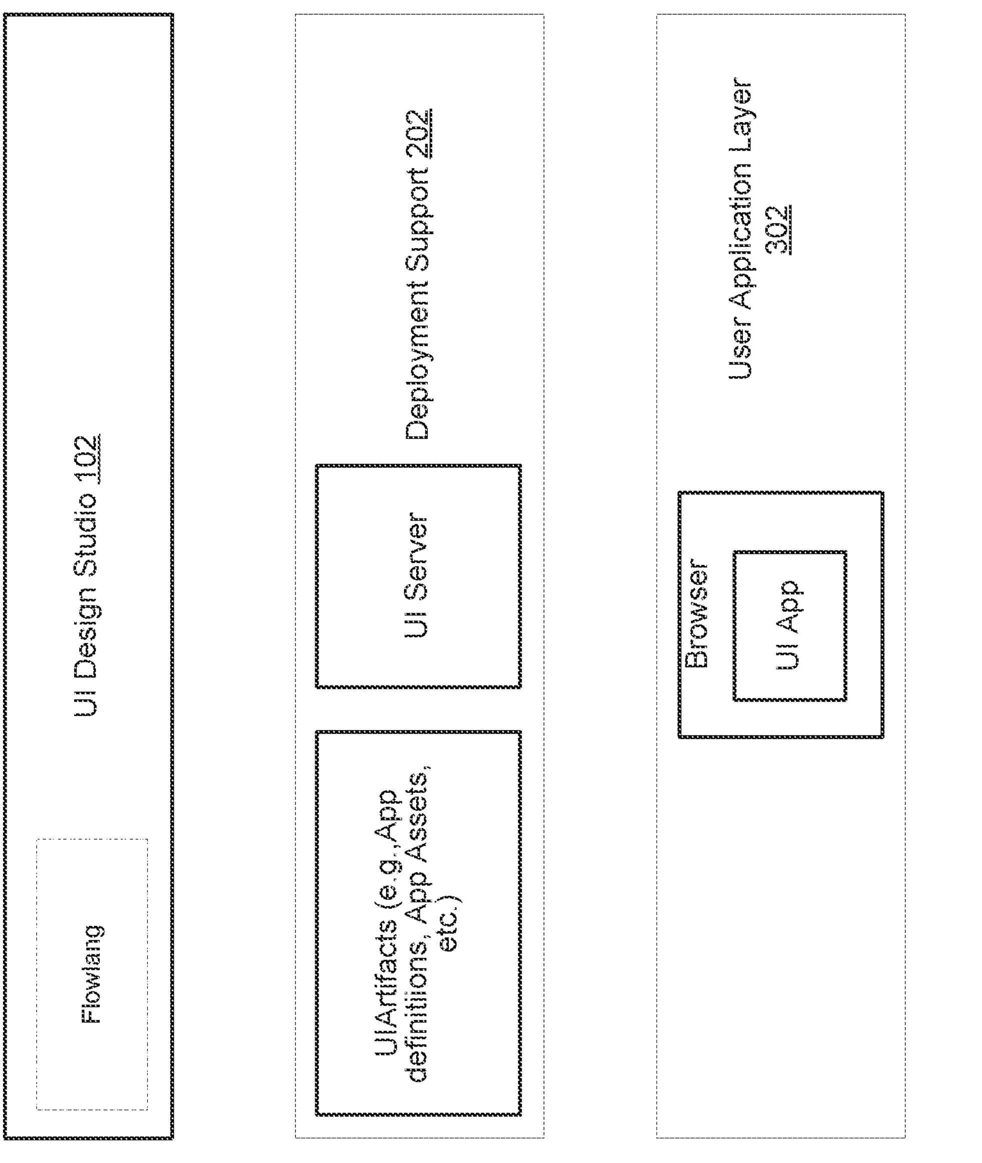
FIG. 1A is a block diagram illustrating a system for developing user interface applications in accordance with an implementation.

Referring to the example of FIG. 1A, a UI design studio 102 supports a visual flow language (Flowlang) to design user interface applications. The UI design studio 102 may, for example, be implemented on a computing device or a server. A deployment support architecture 202 may be implemented in different ways to use the output of the UI design studio 102 to support the deployment of a UI design. The deployment support architecture 202 may include UI artifacts, such as app definitions and app assets. It may include a UI server to support deploying a UI design. A user application layer 302 is illustrated having a front-end UI app in a browser.

In one implementation, there is an application flow graph design phase using the visual flow language. In one embodiment, in the design phase, a user may select components from a catalog, drag and drop components into place, and form connections between nodes of components using, for example, call stream connections or data mapping connections. Steps to configure/customize features or characteristics of components may be performed. In a build phase, an application definition file may be generated and used to build the UI application. However, from the standpoint of an end user, they can design the UI application using the Visual Flow Language without having to do coding. Other software (e.g. a flow engine) is included in the MVF architecture to automatically walk the application flow graph, generate the logical graph and perform other steps to build the final UI application.

Figure 1B:
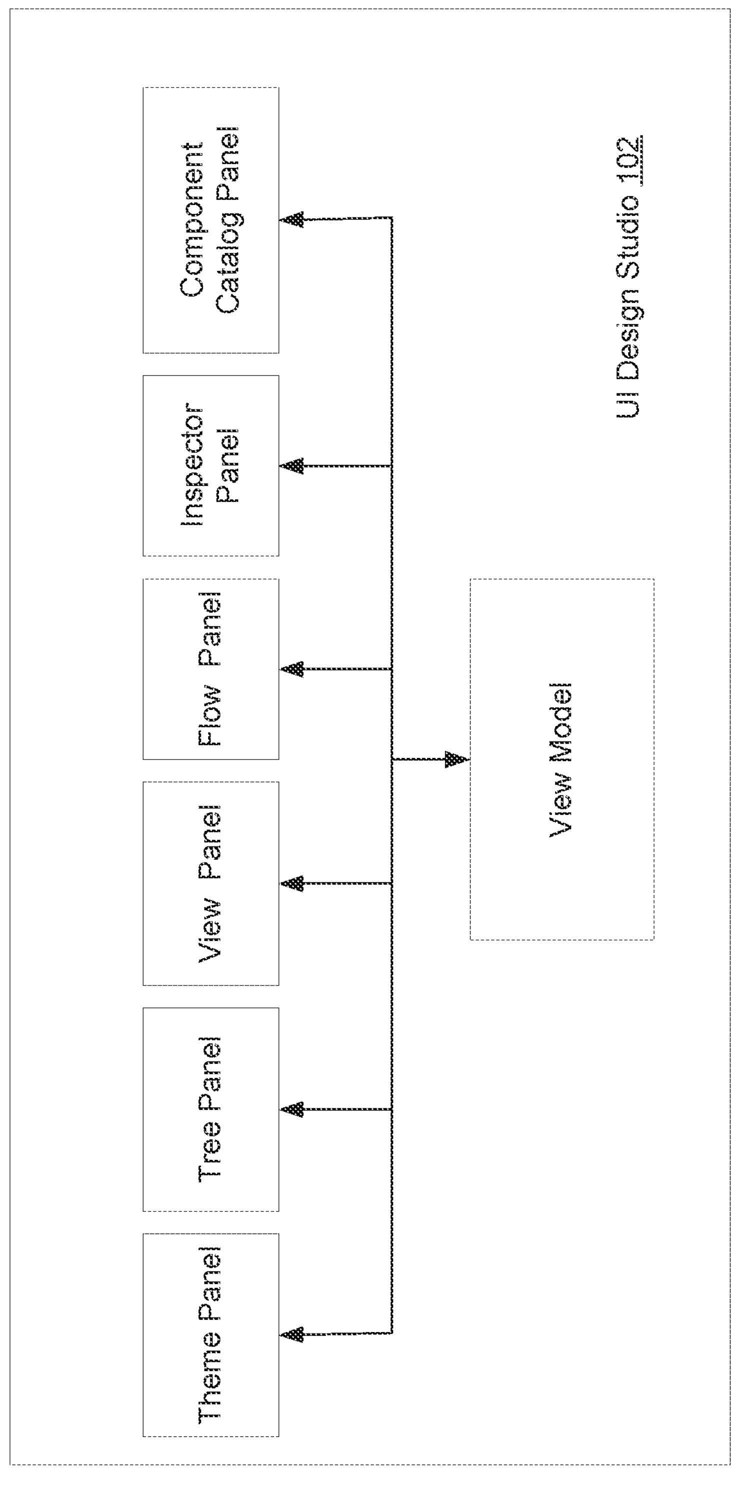
FIG. 1B is a block diagram illustrating an example of features in a UI design studio in accordance with an implementation.

FIG. 1B illustrates an example of a UI design studio 102. Panels may be supported in an integrated design environment (IDE) to generate a view model. The panels may include a theme panel, a tree panel, a view panel, a flow panel, an inspector panel, and a component catalog panel. Flowlang is an authoring tool built on top of an Integrated Development Environment (IDE). The UI design studio application may, in some implementations, include a Visual Studio (VS) Code plug-in module.

A component panel aids a user to select a component from a variety of different component types. For example, a drag and drop functionality may be supported to select a component, drag into place onto an application flow panel. As an application tree is built up during a design process, UI tree panel may summarize things like the current list of components and other attributes. A panel to configure styles and themes may be provided. For example, a variety of adjustments to visual appearance of a UI may be supported, as well as styles specific for a particular end customer, such as a company-specific color scheme. The application flow panel may be included to design an application flow graph using a visual flow language. A UI preview panel may be included to permit a preview of the UI app to be displayed.

The app flow logic may be configured visually between components. This enables app developers to create truly unique and customized components and applications, while also supporting app developers that just want to quickly create apps using standard components. It also enables other roles, such as product managers, designers, and quality assurance (QA), to understand, modify, and construct application flows without knowing how to write code.

In some implementations, the application flow graph generated using the visual flow language is used to generate application definition files (or similar information) to permit a deployment support architecture, such as a cloud or enterprise implementation, to support deployment of the UI app in a browser. For example, visually designing a UI application in the flow panel may be used to generate an application logic graph used to compile the applications, and used to execute application logic in the client (i.e. browser or mobile app). Files describing the application logic graph may, for example, be passed to the deployment support layer or otherwise used to generate application definition files.

Figure 1C:
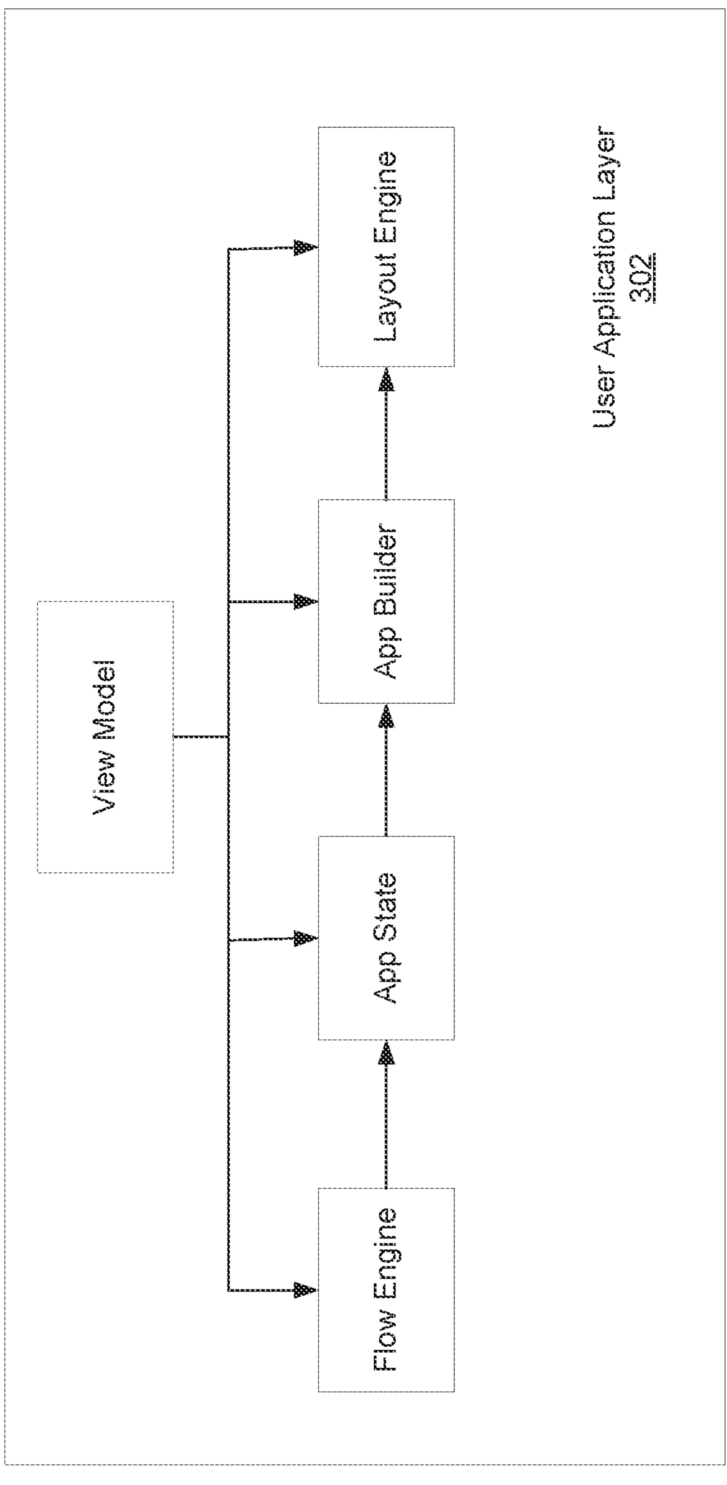
FIG. 1C is a block diagram illustrating a user application architecture layer in accordance with an implementation.

FIG. 1C illustrates an example of a user application layer 302. A view model supports a flow engine, app state module, app builder model and a layout engine. However implementations are also possible depending on implementation details.

The deployment of the final UI app may be implemented in different ways, such as via the cloud. A UIflow cloud-based implementation may, for example, include using commercial cloud services (e.g., Amazon Web Services® (AWS)) and cloud support features such as a relational database service (RDS), a live EB Web server®, .com EB Web server®, and App Compiler EB worker®. In one implementation, S3 cloud storage® may store application definitions (App Def) and Application Static Assets (App Static Assets).

Figure 1D:
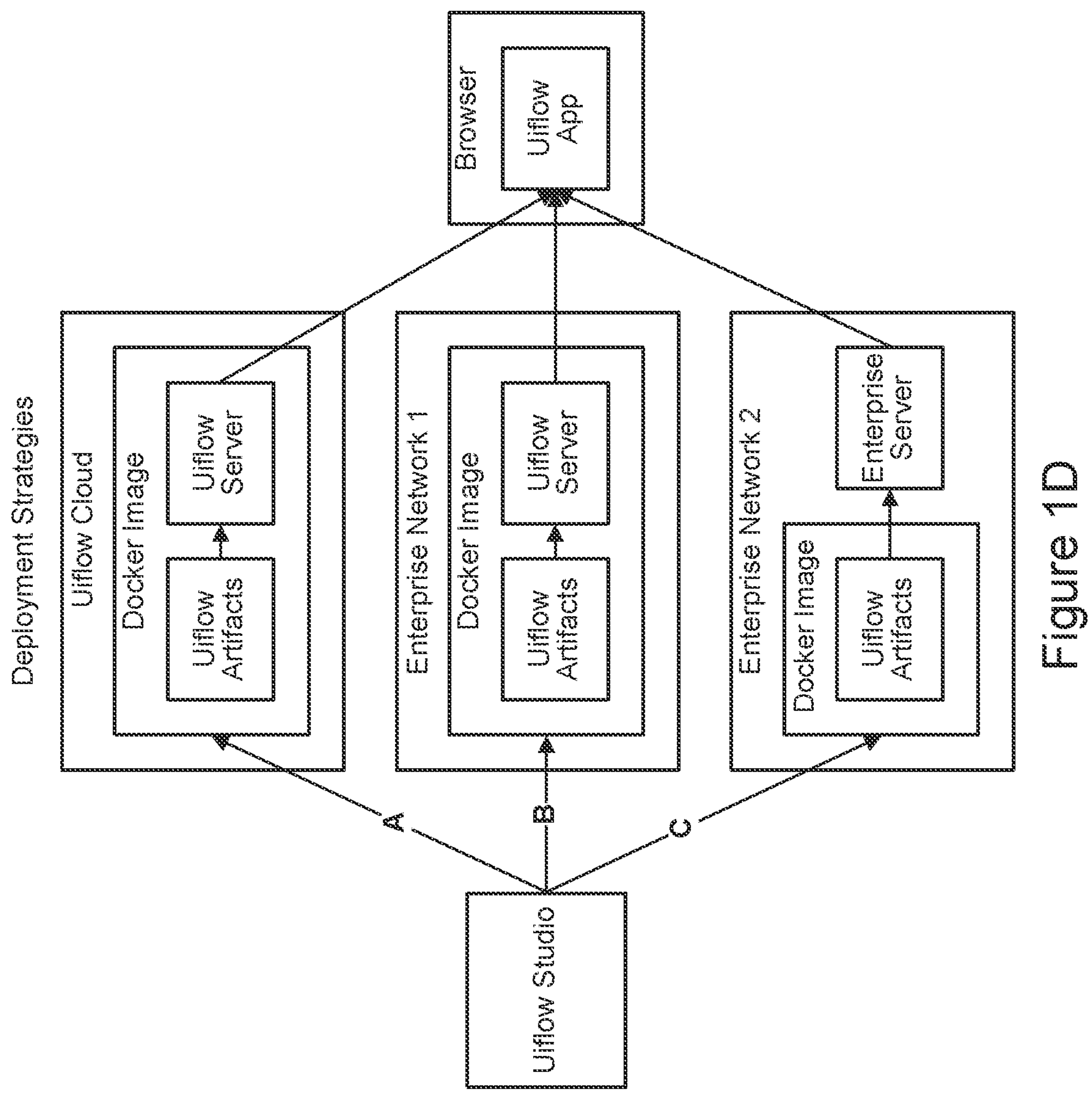
FIG. 1D illustrates an example of deployment strategies using docker images in accordance with an implementation.

FIG. 1D illustrates another example of deployment strategies. The deployment support layer may be implemented through an enterprise network or in the cloud. In some implementations, a docker image may be used where docker is an open platform to create containers for applications.

Figure 1E:
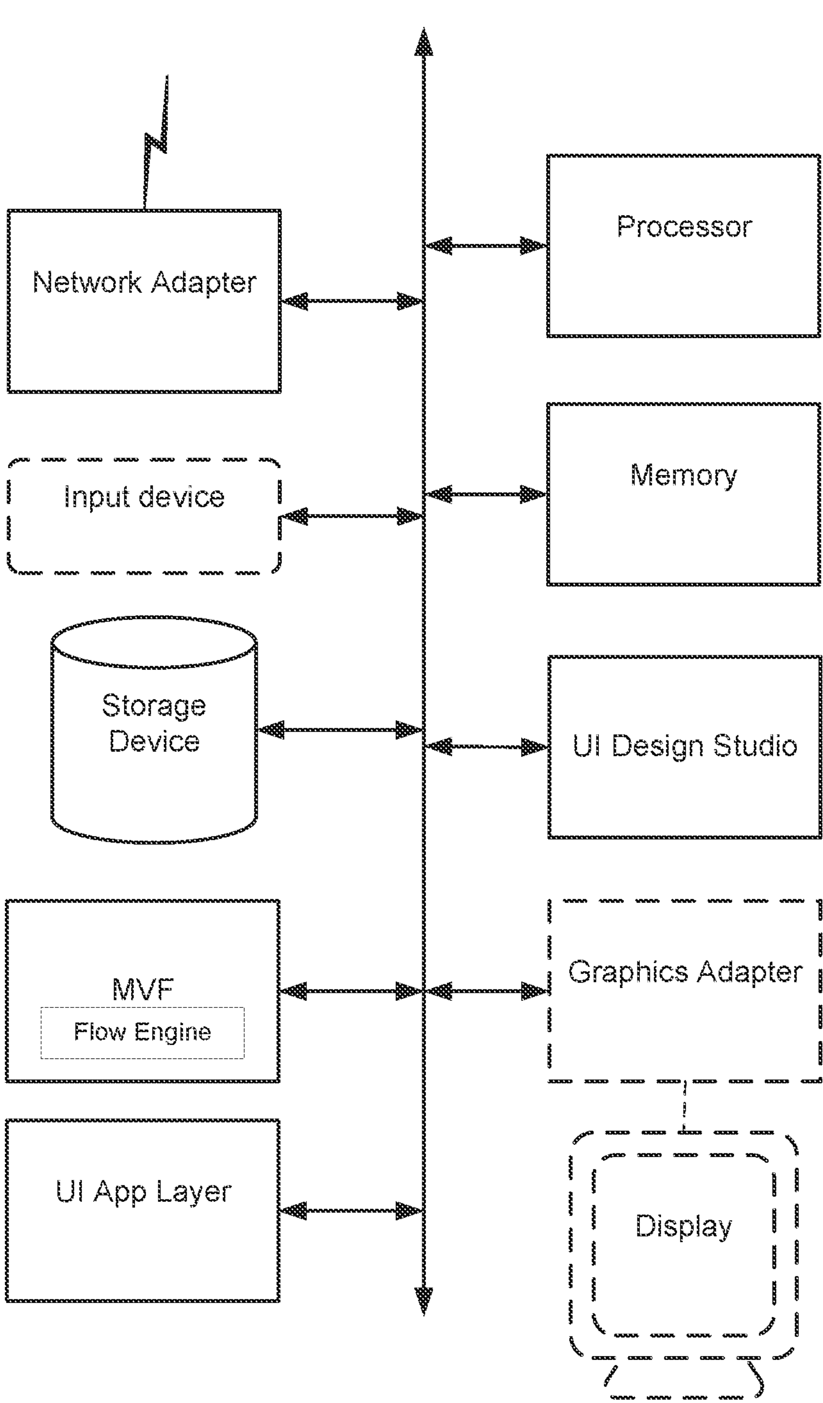
FIG. 1E illustrates an example of a server-based implementation in accordance with an implementation.

FIG. 1E illustrates how some aspects of an implementation may be implemented as computer program instructions stored in a non-transitory memory of a server. That is, in principle, an enterprise could implement MVF and Flowlang in a server-based system.

MVF High-Level Description

Figure 2:
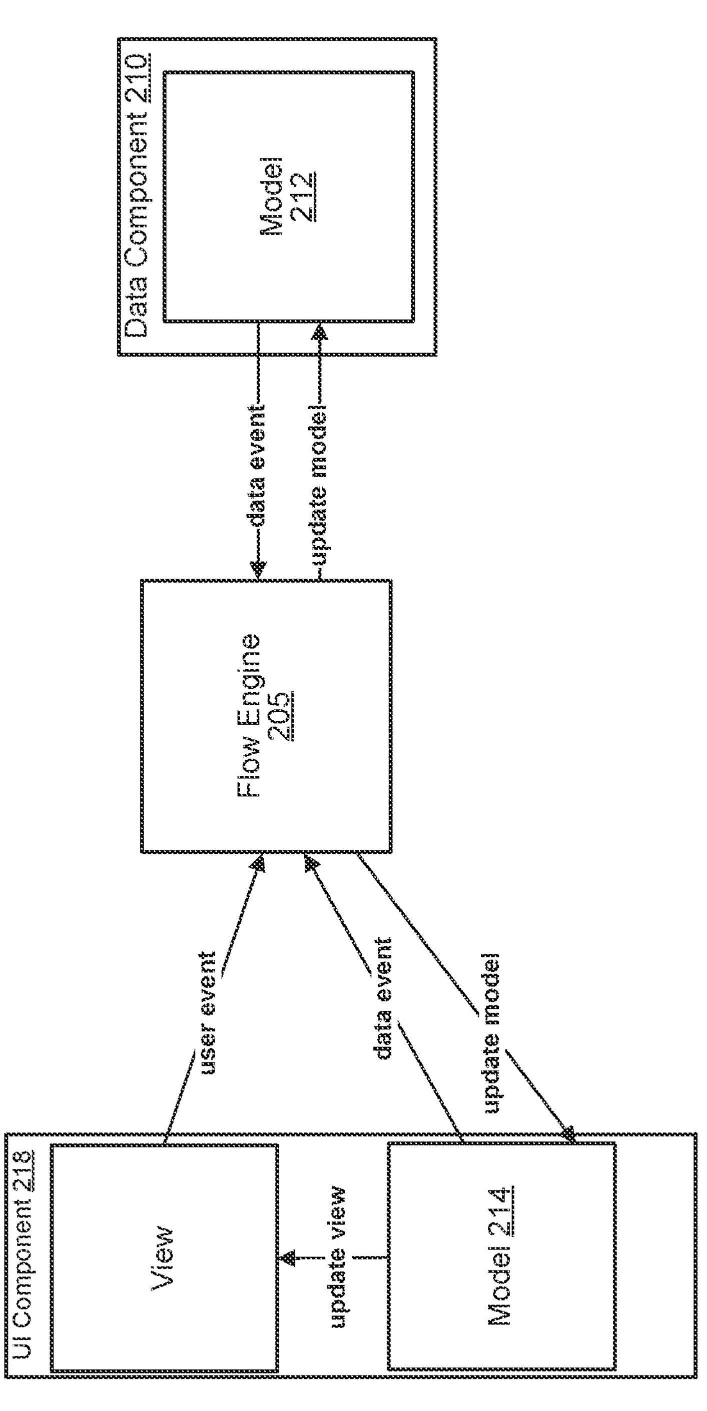
FIG. 2 is a block diagram illustrating a Model View Flow (MVF) architecture in accordance with an implementation.

FIG. 2 illustrates an example of a flow engine 205 and components, where the components may include various types such as data components 210, UI components 218, logic components to direct flows (not shown in FIG. 2), and transform components to transform data (not shown in FIG. 2). In the MVF architecture, each component encapsulates its own model. For example, the data component 210 encapsulated its own model 212 and the UI component 218 encapsulates its own model 214.

The UI components emit user-generated events (e.g. button click, input change, etc.) and model events (e.g. button variant changed). Data components emit model change events (e.g. request-response returned, websocket push, etc.).

The UI components make up the UI tree of the application, and are visual. UI components have methods and can fire events. UI components can also store state information.

Logic Components are the “glue” between UI and other components. They take in inputs and transform them into outputs. They can also take in call streams and split the streams, or have logic built in for routing streams (like logical switches).

In one implementation, the flow engine listens for these events and traverses the logic graph passing through logic components and calling actions on other UI components or data components.

In one implementation, MVF models the entire application logic layer as a directed graph, and the components are responsible for their own respective models that they encapsulate. In application software, the flow construct is implemented as the flow engine that traverses an application logic graph in order to control how the application functions.

Figure 3:
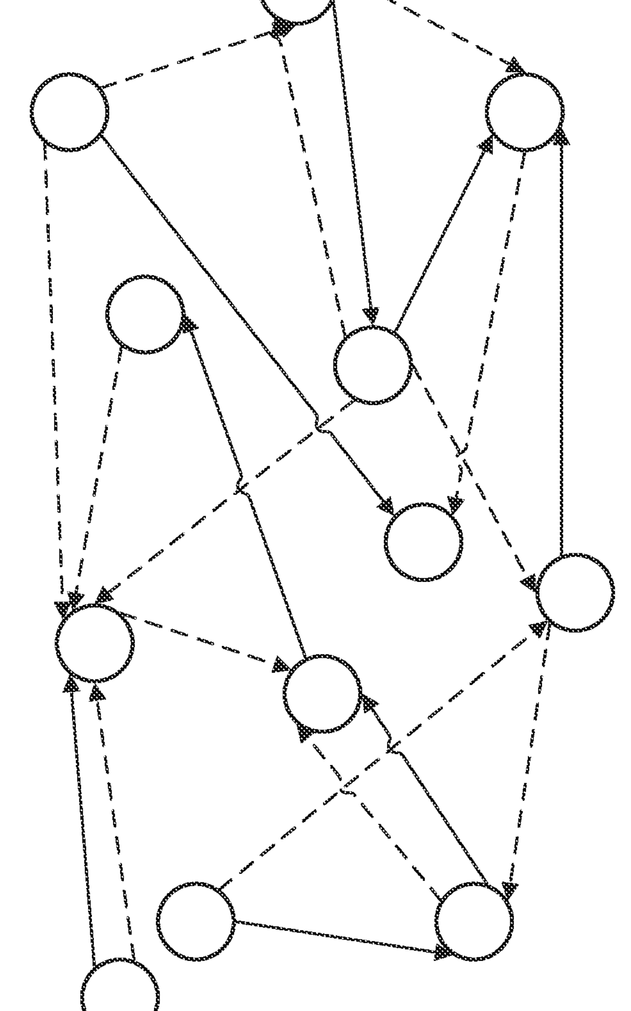
FIG. 3 illustrates an application logic graph in accordance with an implementation.

FIG. 3 illustrates a general application logic graph. The application logic is represented as a directed graph with two different kinds of edges: call lines and data lines. When an event is detected in the system, a new stream begins, and the flow engine begins traversing the logic graph starting with the component where the event originated. In FIG. 3, call lines are illustrated as dashed lines, and data mapping lines are illustrated by solid lines.

FIG. 4 illustrates four component types of MVF applications: a UI component type, a data component type, a logical component type, and a transform component type. All call streams begin with a UI component or data component event, and end with a UI component or data component action. Logic components are used to direct the flows. Logic components are used to "glue" UI components together. Logic components include transforms, branches, and debugging. Transform components are used to transform data required for input parameters to other transform components, or input parameters to actions for UI components or data components. Note that an individual component may have more than one data mapping as an input and more than one call stream as an output.

Components may also include integration components. UI components make up the visual aspects of the application. Integration components, which may include rest, or vendor specific components that access data from other services such as Stripe®, Twilio®, Salesforce®, AWS®, etc. Integration components are used for connecting to systems outside of the app. Examples include, Restful components, third party integration components for Salesforce® or AWS®, or Websocket components. In one implementation, integration components have methods, and can fire events. They do not store state.

In one implementation, UI components can contain any number of other component types or primitive components. Primitive components are UI components that cannot contain other UI components, such as text, text inputs, or icons. For certain block types, nodes can be configurable. Data adapters are created visually by combining transformation blocks that build and extract objects and arrays.

A hierarchy may be provided for components, blocks within components, and nodes within blocks. Examples of components include UI components, data components, logic components, and transform components.

Figures 5A, 5B:
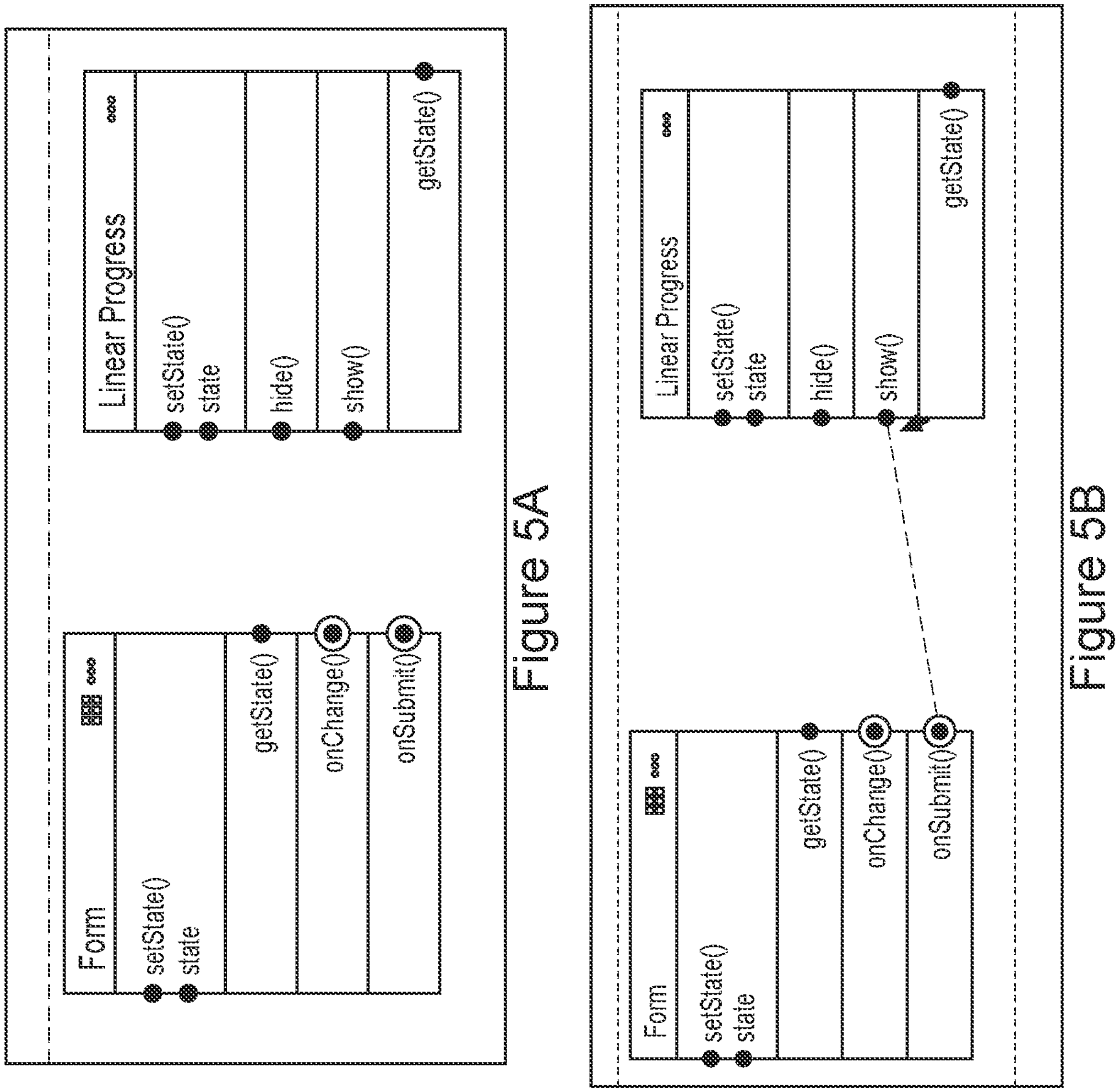
FIGS. 5A and 5B illustrate examples of components with blocks and nodes in accordance with an implementation.

FIG. 5A illustrates an initial selection of two components and FIG. 5B illustrates forming connections between nodes of the two components. As illustrated in FIGS. 5A and 5B, components may be selected in the design studio. An individual component may have one or more blocks. In some examples, the blocks are configurable. In some implementations, mouse operations (e.g., dragging, dropping, mouse clicks/mouse-ups) may be used to move components, insert components, configure components, and form call stream or data mapping connections between components. That is, an individual component may include one or more blocks, where a block has nodes that are coupled to other nodes by a call stream or data mapping. An individual component may provide options for its configuration, depending on the type of component.

Figure 6:
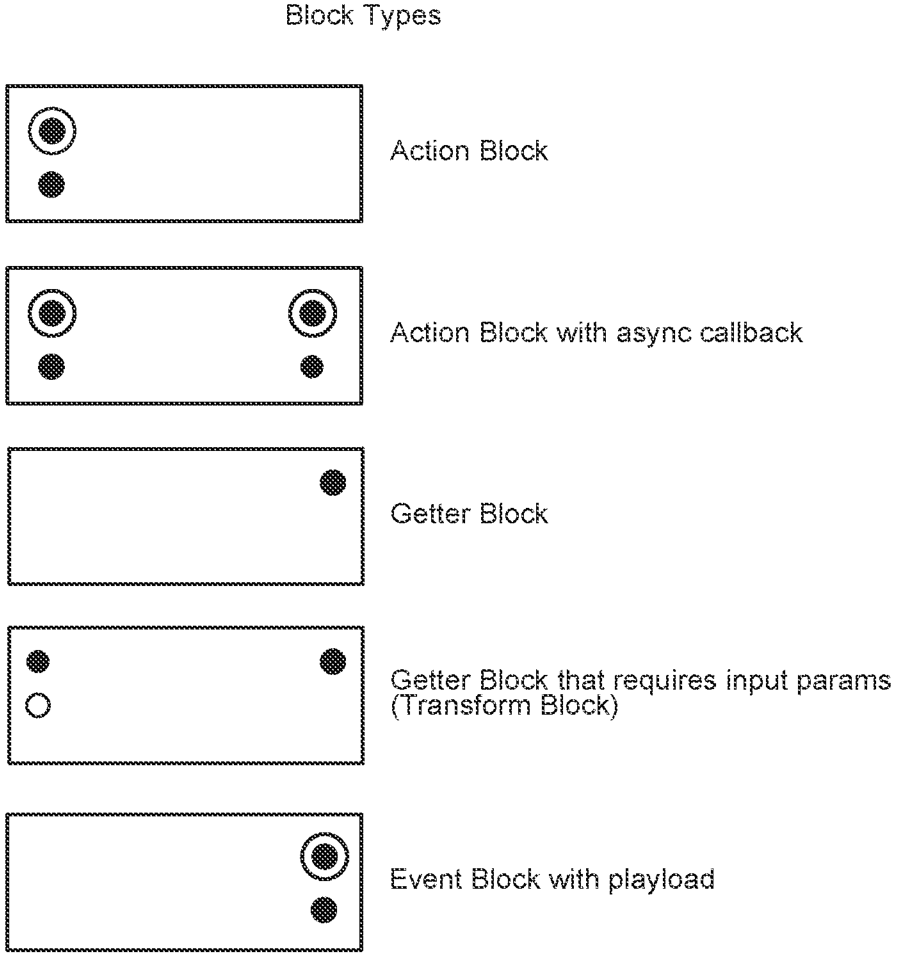
FIG. 6 illustrates examples of block types in accordance with an implementation.

FIG. 6 illustrates some examples of block types corresponding to an action block, an action block with async callback, a getter block, a getter block that requires input parameters, and an event block with playback.

Figure 7:
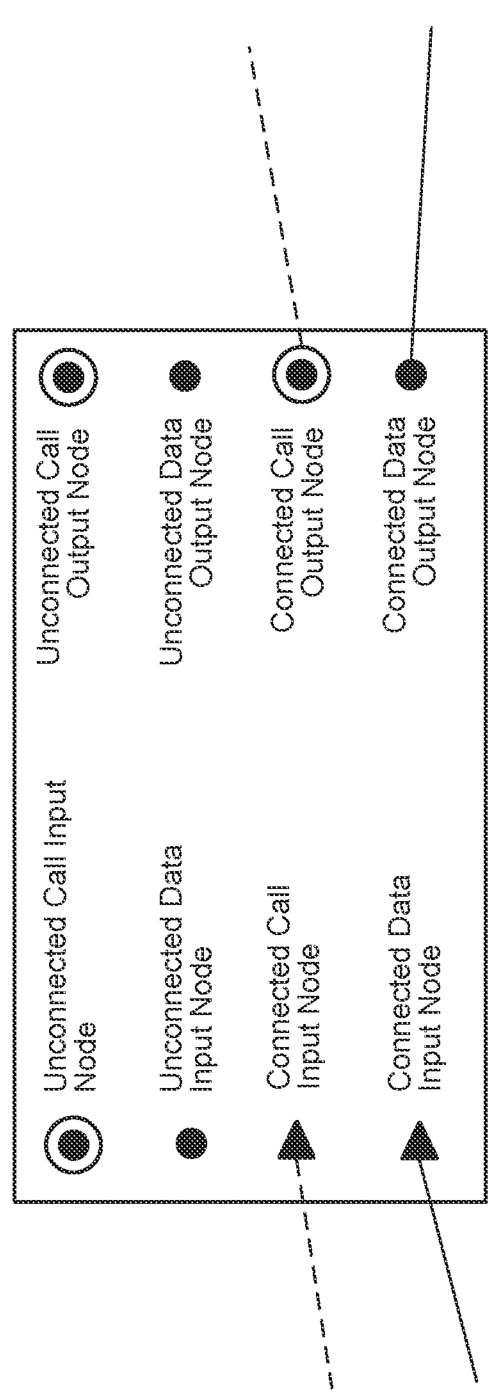
FIG. 7 illustrates an example of node type visualization in accordance with an implementation.

FIG. 7 illustrates an example of node type visual treatments to represent unconnected call input nodes, unconnected data input nodes, connected call input nodes, connected data input nodes, unconnected call output nodes, unconnected call output nodes, and connected data output nodes.

In one implementation, runtime creation of components is managed in two main ways. First, by classes/instances. A component can be converted to either an instance or a class. If a component is in a class mode, a constructor action is available, and call streams may be connected to the action to create instances of the class. If a component is in a collections mode, users can use collection components which have methods for managing collections of components. The use of classes/instances is a great aid to runtime component creation. App developers need a way to dynamically instantiate one or more components at runtime based on the user behavior. As an example, a UI component can be set as a class which can be used to create an instance at runtime by calling the "constructor( )" method of the class. This enables app developers to configure components as instances in the editor, and then toggle it to a class so that the component can be instantiated at runtime In one implementation, when the application runs either in the preview panel, or in a popped-out window, the flow panel visual language highlights flows that are being executed so that users can see what logic is being executed. Also, the user can inspect the data values for each component via the live value inspector.

FIG. 8A illustrates an example of components with the flow panel language highlighting flows that are being executed. In this example, there are several UI components, several logic components, and several Data Components. Consider now some of the flows in FIG. 8A:

1. The User clicks "Button" component to save data. Call stream is created;
2. The Call stream calls the "If Else" component. This component requires a condition as input. The component retrieves true/false from the "isChecked" data accessor on the "Checkbox" component;
3. In this example, the "Checkbox" component is checked, so the true condition call stream executes, calling the "Request" component to save the data;
4. The "Request" component requires a value to be saved as a parameter. The value of the parameter is provided by the "Truncate" component; and
5. The truncate component takes in an input and truncates the value. The input parameter is "str", which is obtained from the value of the Text Input component.

Figure 8B:
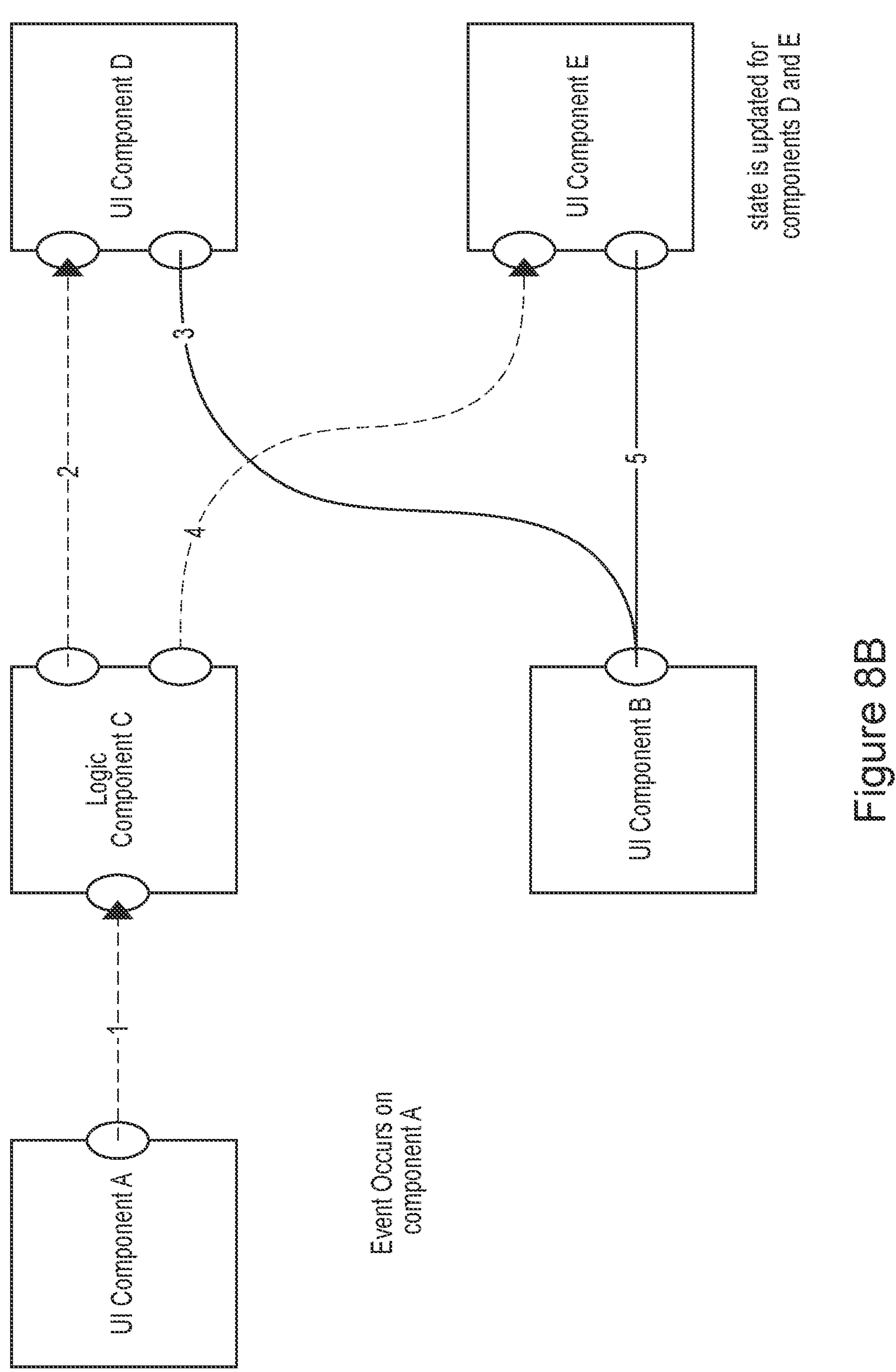
FIG. 8B illustrates an example of a flow between components in accordance with an implementation.

FIG. 8B illustrates a simple example of a flow presented visually. In this example, there are four UI components and one logical component. A description of the flow in this example is now provided. An event occurs on component A, which is received by an input node of logical component C. In this example, logic component C is a splitter that splits a UI stream into two streams a UI call stream 2 and a UI call stream 4. The first UI call stream 2 flows into UI component D. In this example, a method call from UI stream 2 requires a parameter whose value is retrieved from UI component B via data mapping 3. In this example, the splitter of logical component C resumes call execution and a UI call stream 4 flows into UI component E. In this example, a method call from call stream 4 requires a parameter whose value is retrieved by a data mapping from the state of component B.

In theory, this example flow could be represented textually in code. However, even a simple example quickly results in multiple lines of code with many relationships that the programmer has to accurately code and debug. As a result, it's difficult to quickly and easily design and debug a UI.

An exemplary method of creating a flow in Flowlang will now be described. A method of creating a flow may first include identifying an event that will trigger a new flow from a specific component. Second, a connection may be created from an event node to a call node of a logic component (left to right) and repeated until hitting a UI or data component. These are the downstream connections. Third, if a UI or data component requires input parameters, the user connects the input parameters to a transform component (right to left) and repeated until connecting to a UI component or data component. These are the upstream connections.

In one example, interface creation may be supported in different ways. Users need a way to trigger a call or send values for parameters to a component inside a nested component. In some examples, users simply drag one or more nodes to the outside of a bounding box to create one or more interfaces exposing calls and data mapping nodes to a containing component. Creation of an input or output interface depends on whether user drags an input node (creates an input interface) or user drags an output node (creates an output interface). Deletion of an existing interface is possible. Reordering of an existing interface is possible. In some examples, users can create multiple interfaces by specifying a destination component which will create interfaces between source and target components. There can be only one interface for one node in each level.

Figures 9A, 9B:
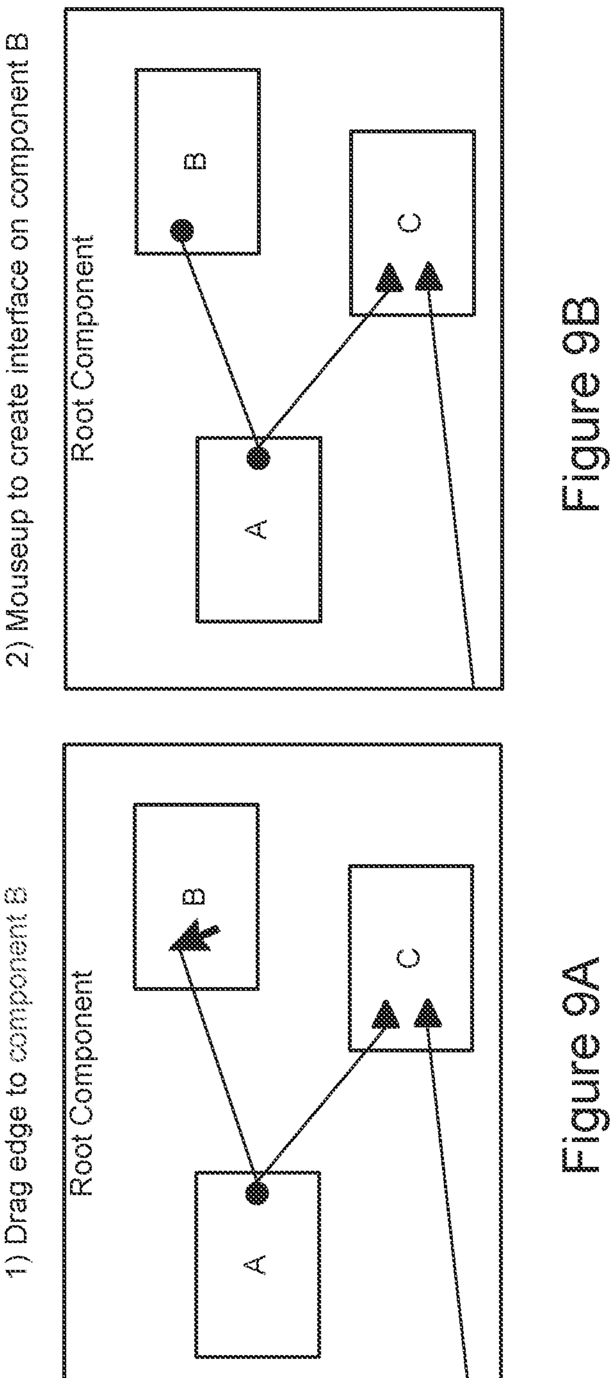
FIGS. 9A and 9B illustrate sibling interface construction in accordance with an implementation.

FIGS. 9A and 9B illustrate sibling interface construction. FIG. 9A illustrates dragging an edge from a component A to a component B. FIG. 9B illustrates a mouse-up to create an interface on component B. That is, simple mouse operations may be used to create sibling interfaces.

Figures 10A, 10B:
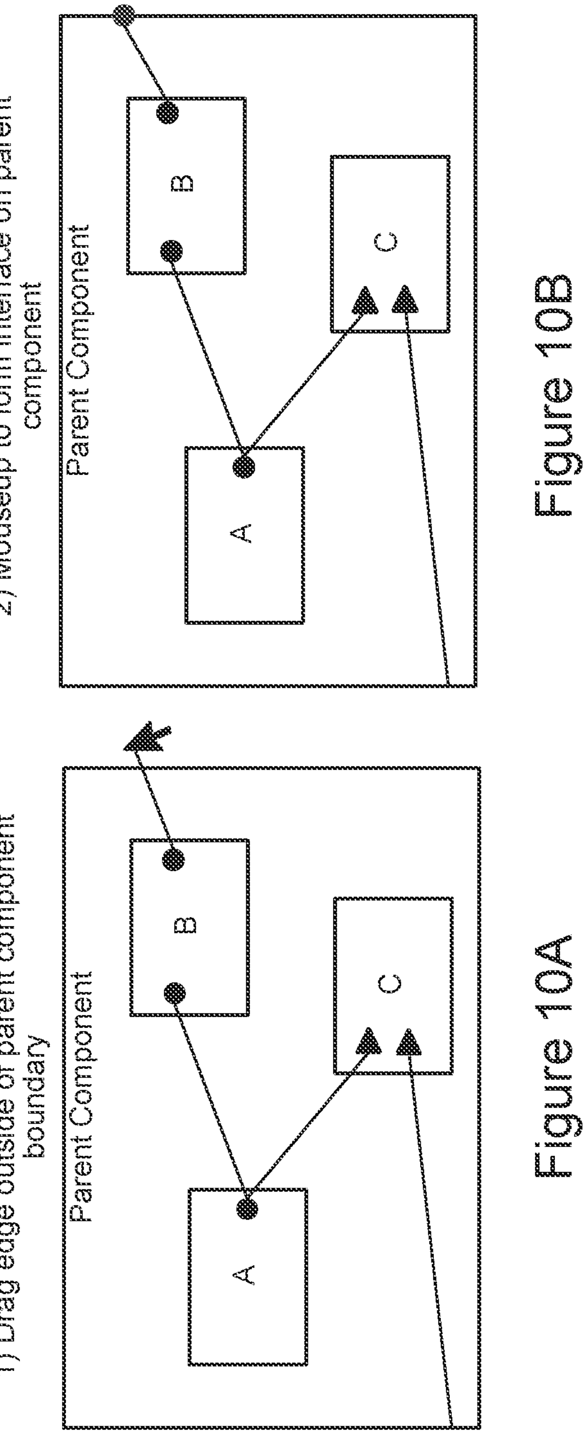
FIGS. 10A and 10B illustrate parent interface construction in accordance with an implementation.

FIGS. 10A and 10B illustrate parent interface construction. In FIG. 10A, a user drags an edge outside of a parent component boundary. In FIG. 10B, a mouse-up is used to form an interface on a parent component.

Figure 11A:
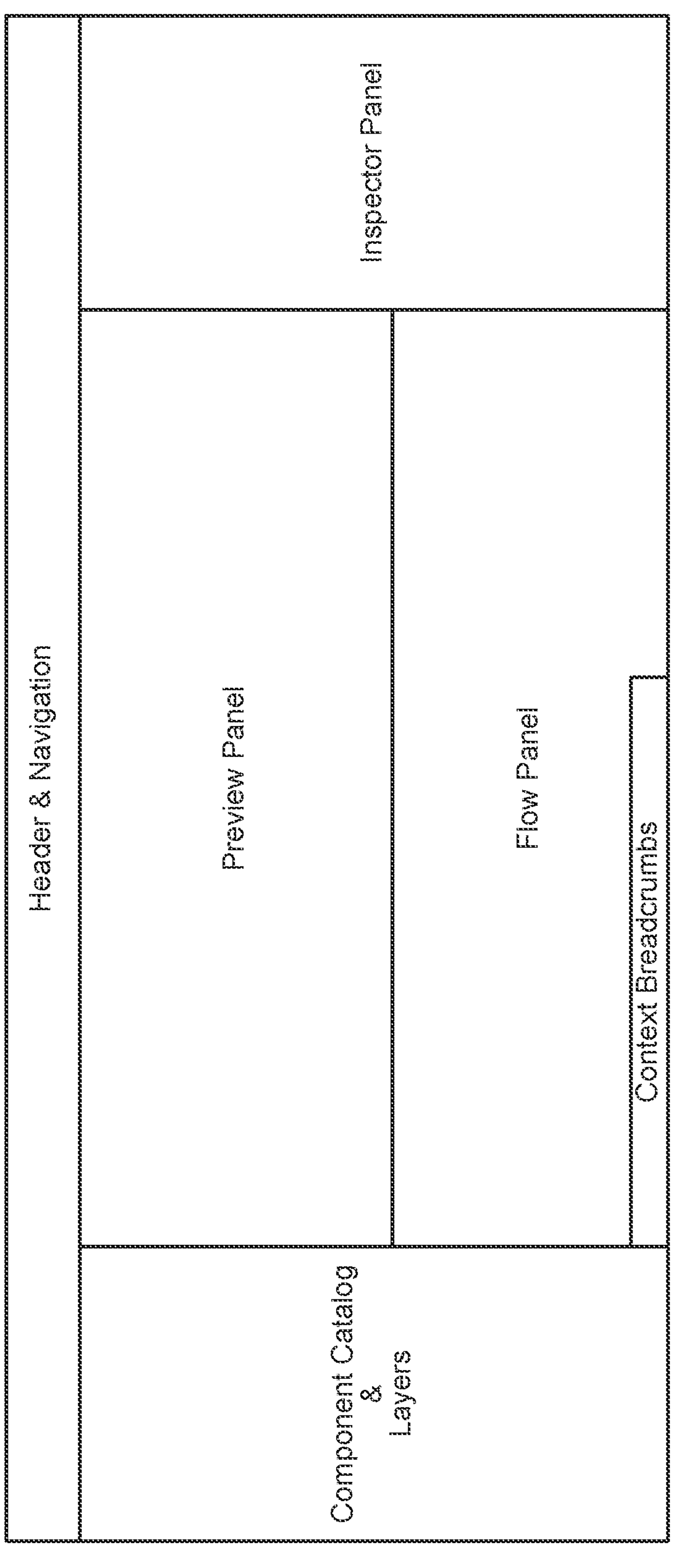
FIG. 11A illustrates an example of major sections of a UIflow design studio in accordance with an implementation.
Figure 11B:
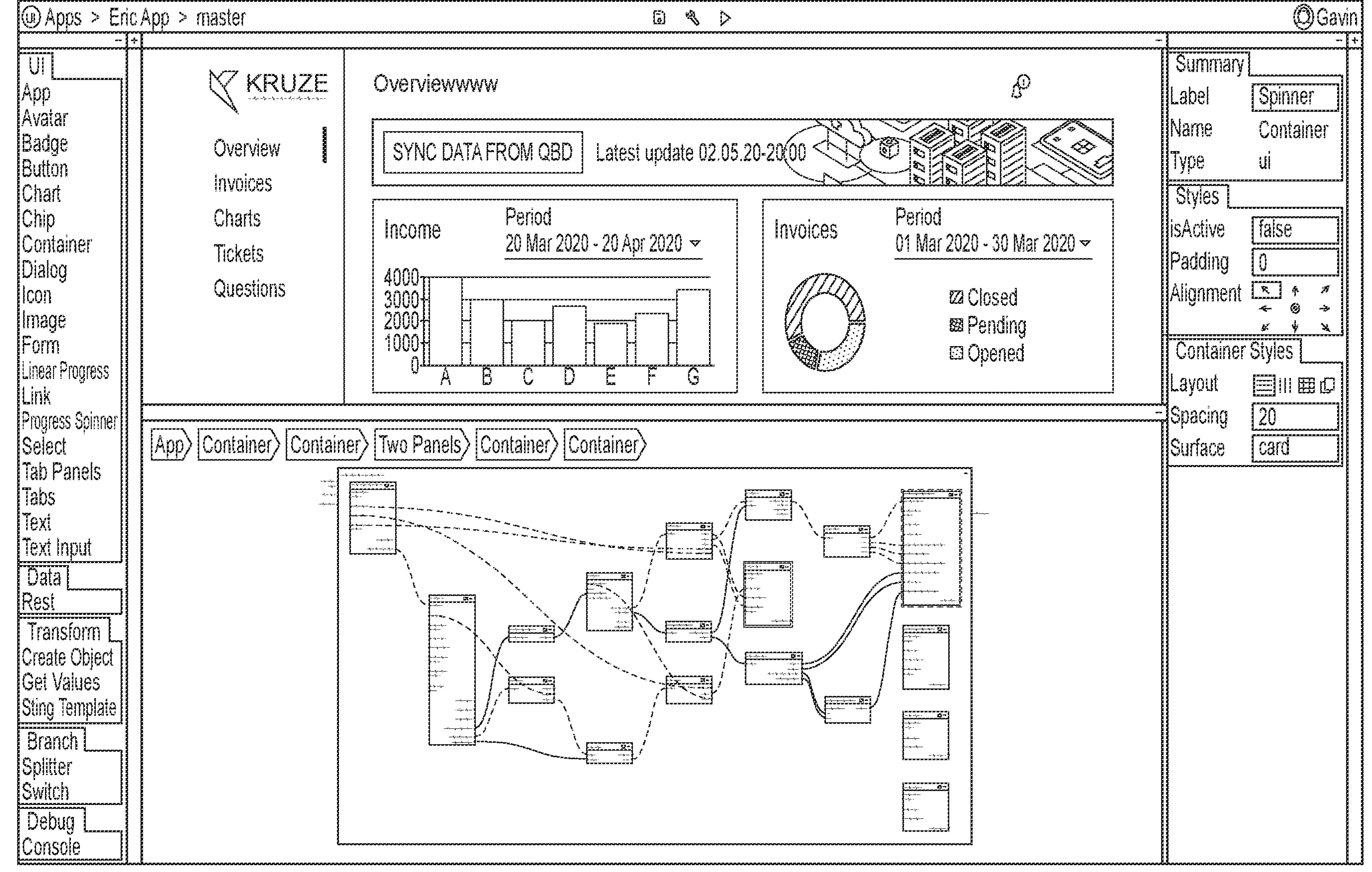
FIG. 11B illustrates an example showing a preview of a UI, a UIflow in the flow panel, a catalog panel, and an inspector panel in accordance with an implementation.
Figure 11C:
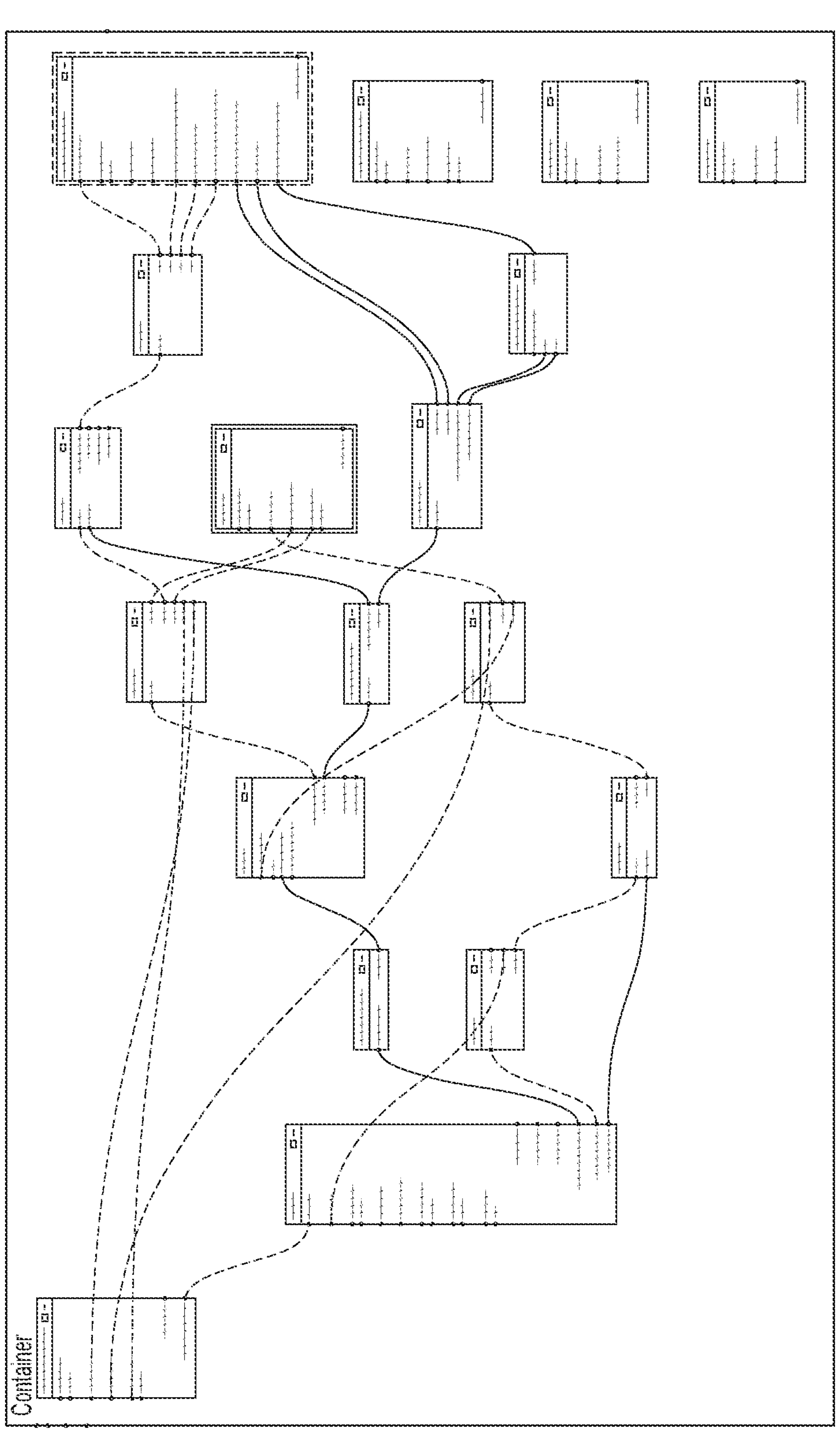
FIG. 11C illustrates an example of a UIflow design.
Figures 11D, 11E:
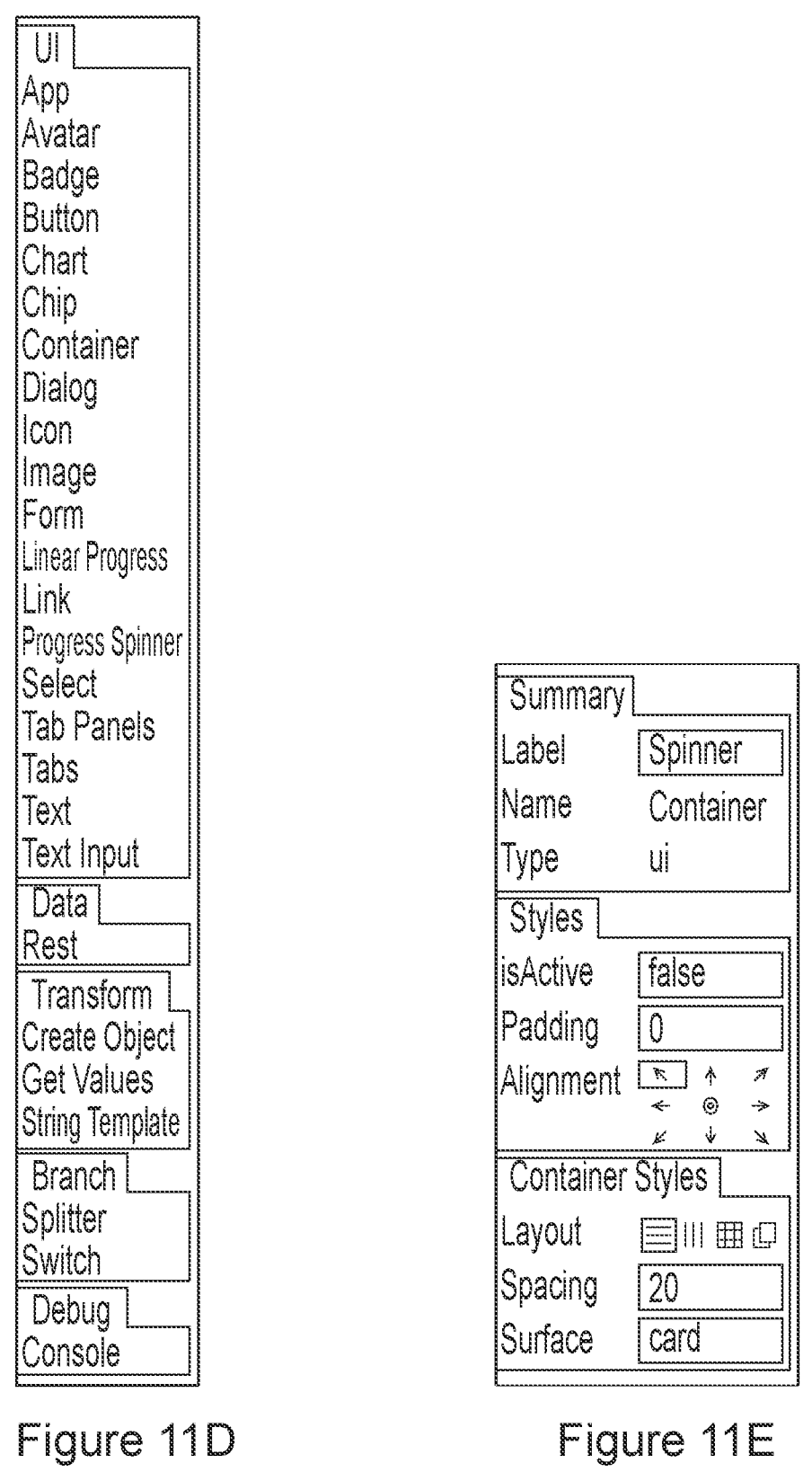

FIG. 11A illustrates an example of UIflow studio. It may include a header & navigation section, a preview panel, a flow panel, an inspector panel, a component catalog & layers panel, and context breadcrumbs. FIG. 11B illustrates a screenshot showing a preview of a user interface (top middle), the flow panel (bottom middle), inspector panel (far right), and component catalog (far left). FIG. 11C illustrates the flow panel in more detail, illustrating a complicated flow diagram with many components and connections between components. FIG. 11D illustrates an example of a component catalog having an example set of components that may be selected by a user. The component catalog, which may, for example, include UI components for an avatar badge, button chart, chip, container, dialog, icon, image, form, linear progress, link, progress spinner, select, tab panels, text, text input. Logical components may include, for example, transform, create object, get values, string template, branch, splitter, switch. Other components may include debug and console. Integration components may also be included such as generic Rest components or vendor specific integrations such as Stripe®, Twilio®, Salesforce®, AWS®, etc. In some implementations, a user drags and drops containers from the component catalog onto the application flow panel. Users may also configure components and form call streams or data mappings between nodes of components as described below in more detail.

FIG. 11E illustrates an example of an inspector panel. The inspector panel may, for example, support inspecting container styles, layout styles, spacing, alignment, labels, and other details.

The creation of custom components may be supported. For example, the component catalog may have an initial set of supported basic components which are supplemented over time by contributions of custom components created by app developers. Additional custom components may be created by app developers and added to the component catalog. In one implementation, app developers are able to create custom components via an IDE plugin to populate IDEs like VS Code (where Visual Studio Code is a code editor redefined and optimized for building and debugging web and cloud applications). If there is a component that the component catalog does not provide, or cannot be found in the marketplace, app developers have the flexibility to create custom components. They can do so by writing code in their language of choice (e.g., for the web this would be TypeScript or JavaScript as an example) while implementing the right interfaces. These custom components can be sent to the UIflow cloud and be made available for the app dev to drag and drop these components into the flow panel and wire up other components with it.

In one implementation, UI framework components can be wrapped as UI components, and any third party vendor APIs or integrations can be wrapped as a Data component. Once prepared, these components can be dragged into the UIflow preview panel or flow panel where the user can begin modeling flows and data mappings between the components. FIG. 12 illustrates how custom code component can be generated. UI framework components can be wrapped as UI components. Additionally, any third party APIs or integrations can be wrapped as a data component. Once prepared, the custom components can be dragged into the UI preview panel or flow panel so that the user can use them to model flows and data aping between components.

Figure 13:
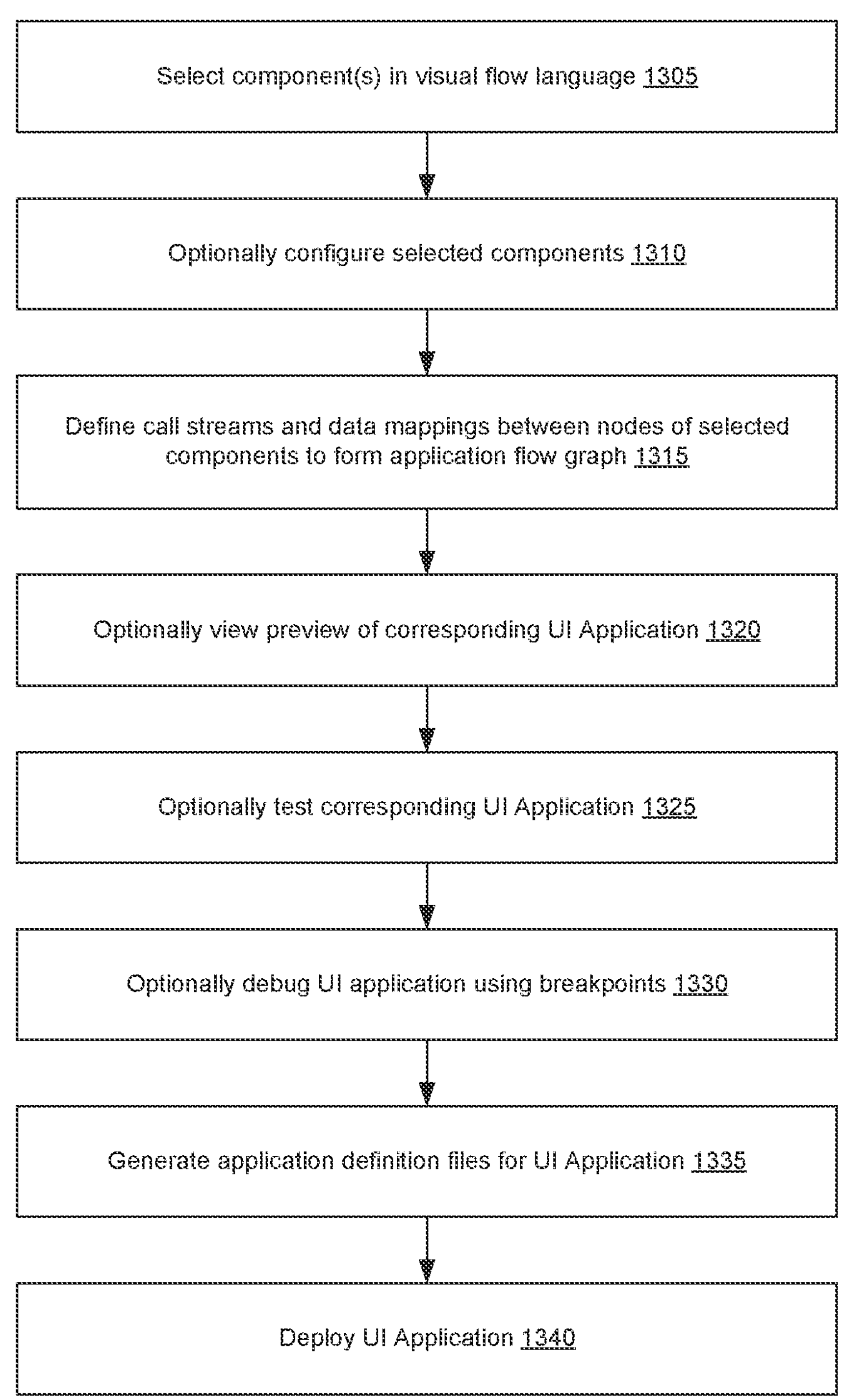
FIG. 13 is a flowchart of method in accordance with an implementation.

FIG. 13 is a flow chart of method in accordance with an example. In block 1305 a user selects components. In block 1310, a user may optionally configure components, such as configuring block types in a component. In block 1315, a user defines call streams and data mappings between nodes of selected components to form an application flow graph. The application flow graph is used to generate a UI application. In block 1320, a user may optionally preview the UI application. In block 1325, the user may optionally perform a test of the user application. In block 1330, a user may optionally debug the UI application, such as by using breakpoints to step through the application. In block 1335 definition files (or other information) required to generate the UI application are created. In block 1340 the UI application is deployed.

Figure 14:
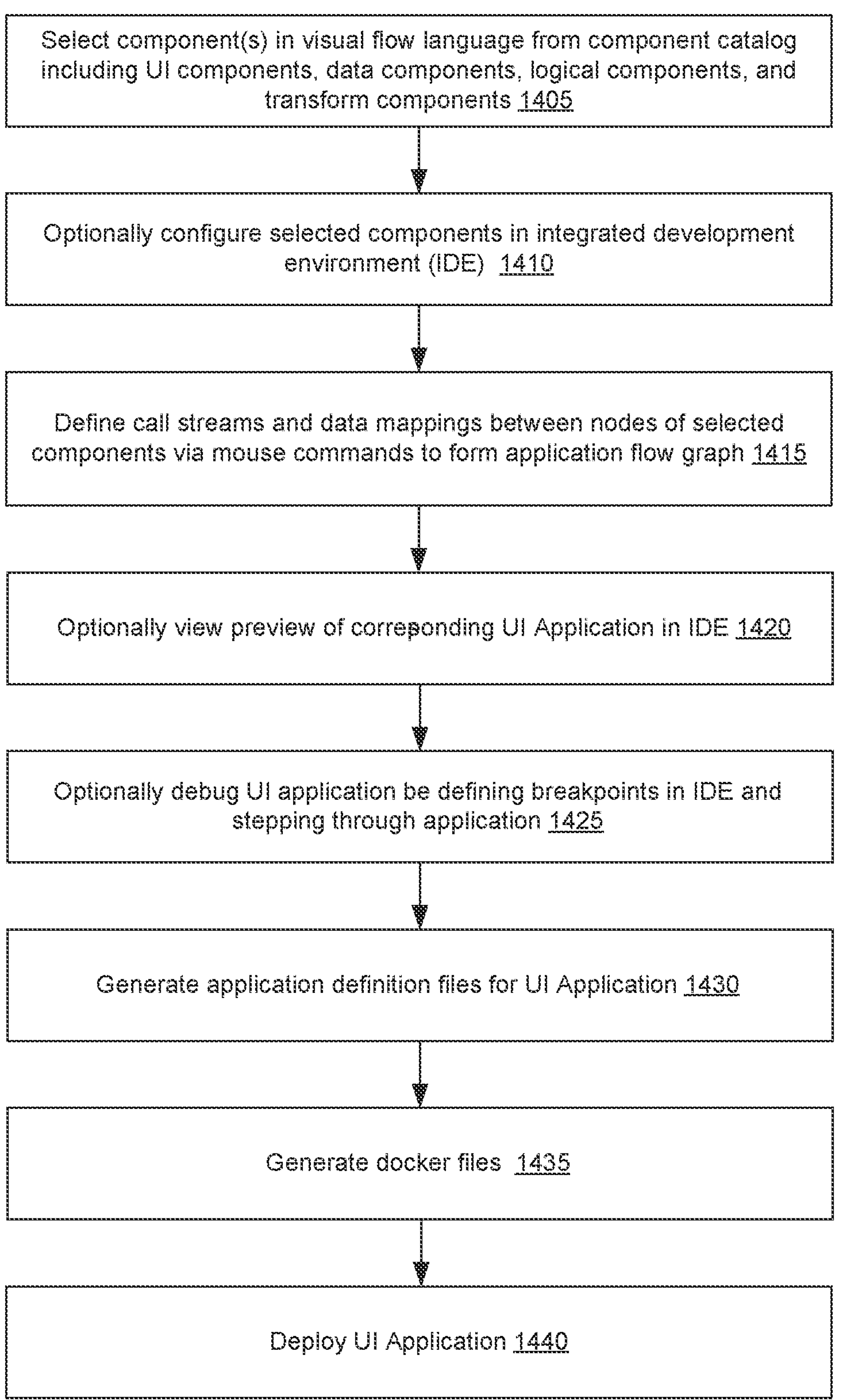
FIG. 14 is a flowchart of a method in accordance with an implementation.

FIG. 14 is a flow chart of a more detailed method in accordance with an example. In block 1405, a user selects components from a component catalog that may include UI components, data components, logical components, and transform components. In block 1410, a user may optionally configure selected components that are configurable. In block 1415, a user defines call streams and data mappings between nodes of selected components via UI commands (e.g., mouse commands) to form an application flow growth. In block 1420, a user optionally previews of the corresponding UI application. In block 1425, a user may optionally debug a UI application, such as by setting breakpoints and stepping through the application. In block 1430, application definition files are generated for a UI application. In block 1435, docker files are generated. In block 1440, a UI application is deployed using the docker files.

Figure 15:
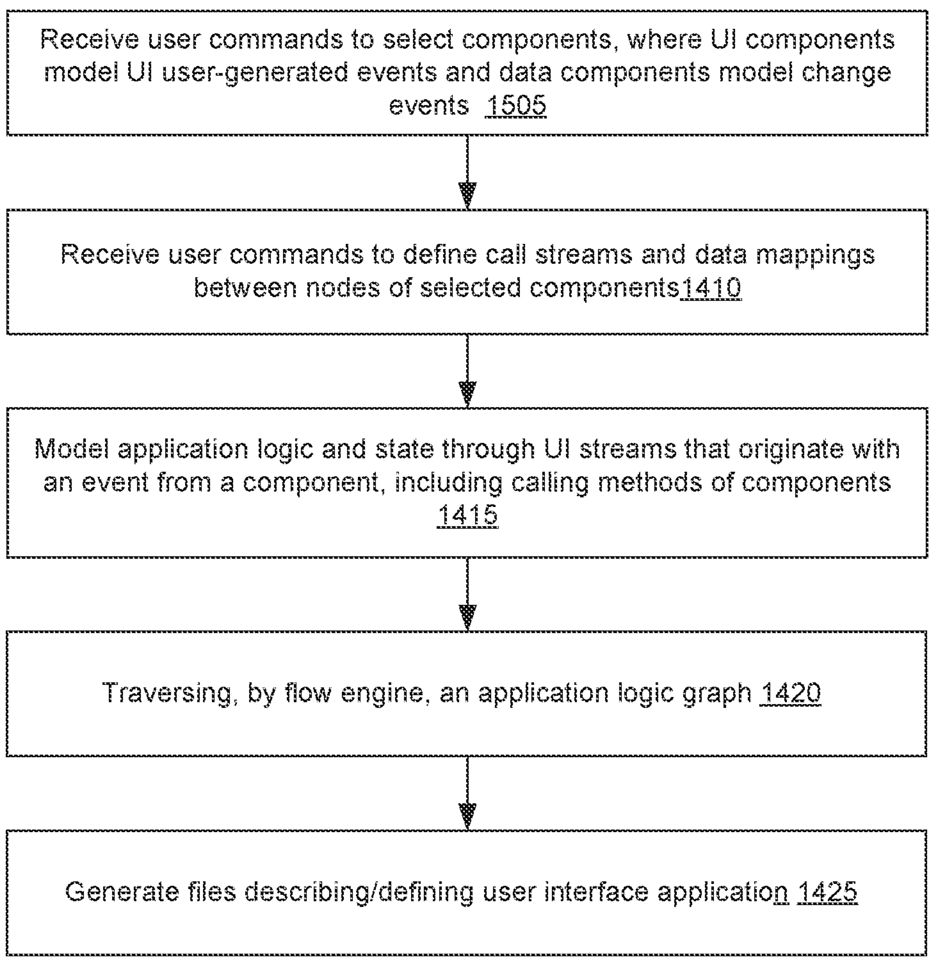
FIG. 15 is a flow chart of another example method in accordance with an implementation.

FIG. 15 is a flow chart of another method of operation. In block 1505, the system received user component to select components, where each component includes a respective component model to model the component behavior. In block 1410, the system received user interface commands to define call streams and data mapping between nodes of selected components. In block 1415, the system models application logic and state through UI streams. In block 1420, the system traverse, through a flow engine, an application logic graph for the UI application. In block 1425, the system generates the files to describe the UI application.

Other Aspects of FlowLang

In Flowlang, all block inputs and outputs are strongly typed, meaning that the data types are known at design time. This permits a static analysis, where the system can communicate error or warnings to the user before the application is run.

Flowlang may include features to support debugging. For example, in some implementations of Flowlang users can set breakpoints on individual components in order to execute flows and pause on components so that the user can inspect the component values at a particular point in time and then continue the execution flow by pressing a "Next" button. Setting breakpoints to step through the execution flow is particularly useful when debugging loops or sections of the logic that are recursive.

In some implementations, the Flow panel enables app developers to add breakpoints at different connections, for either call connections, or data mapping connections. When the app is executed, the call execution stops at each breakpoint (similar to traditional code debugging) and app developers are able to inspect all of the values at that point in the execution for debugging purposes. App developers are able to change data values at the breakpoints to affect the rest of the application flow. App developers are able to see the execution path visually by highlighting components and connections while application is running in debug mode. App developers are able to step through each unit of execution (similar to step over/into/out) and observe how application runs on each step. App developers are able to save and load the entire state of application to reproduce the issue at hand.

In some examples, functional tests may be supported. App developers will use the same visual language to create functional tests. The testing environment will host these tests in development environment and allow testers to run single or multiple tests (test suites) manually or automatically on scheduled time or action.

A variety of other feature and optimizations may be supported. In one implementation, MVF call streams are represented with dashed lines whereas MVF data mappings are represented with solid lines. In one implementation, only call nodes can be connected together (an input/output pair of nodes). In one implementation, only data mapping nodes can be connected together (an input/output pair of nodes and based on the type of data being transmitted).

In some implementations, App developers will be able to highlight call streams in different ways. One example includes mousing over or selecting a component, which may result in all inbound and outbound connections being highlighted. Another example includes mousing over or selecting an output node, which results in all downstream call streams being highlighted. Yet another example includes mousing over or selecting an input node, which results in all upstream call streams being highlighted.

In one implementation, node reordering is supported. In order to yield nicer looking flow graphs, app developers will be able to reorder input and output nodes by dragging them, in order to reduce connection overlapping.

In one implementation, an auto layout feature is supported. In some implementations, the Flow panel will also have an "auto layout feature" which will automatically position components and nodes in order to yield the best layout possible with the least stream crossovers.

Positioning guides may be provided such that as the user freely moves components around, the flow panel will draw vertical and horizontal guide lines in order to line up the component with other components based on center, left edge, and right edge alignments.

Connection elasticity may be supported so that as users move components around, the connections (e.g., call streaming connections or data mapping connections) remain elastic like a rubber band.

Auto interface generation may also be supported such that when an app developer wants to expose a method from one component to another, they will have the option to click on a related actions link, and click on "create interface", and then choose a component to expose the interface to. This will automatically create the interface connections at the right levels to make the full connection.

Version compatibility of components and connections may be supported. If a more recent version of a component is available, an, app developer can choose to upgrade the component manually or automatically if all compatibility check passes. App developers can be notified visually whether a newer version of components are available. App developers will be notified when there is an incompatible component used in the application.

Auto suggestion (based on machine learning) may be supported of relevant components/connections. In some implementations, machine learning techniques are used to make suggestions to aid UI designers. Data on final UIflow graphs and user choices during design of UIflow graphs may be stored in a training set database. Machine learning algorithms can be used to aid UI designers. By using existing application flow graphs as training sets, we can start suggesting/predicting using machine learning algorithms like GPT-3 which components are relevant as a next component to be added automatically. Similarly, suggestions can be made for connections. These models can also identify potential inefficiencies and suggest better ways to meet the objectives at hand.

Live collaboration may also be supported. such that when multiple app developers log into the same app and the same branch, they can collaborate together live.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method for comprising:

receiving, via a user interface design studio, a user selection of components from a component catalog, wherein the components comprise at least one of user interface (UI) components, data components, logical components, and transform components;

displaying the selected components in a flow panel of the user interface design studio;

receiving user input to define connections between nodes of the selected components, wherein the connections comprise call streams and data mappings;

generating an application logic graph based on the selected components and defined connections; and creating a user interface application based on the application logic graph.

2. The method of claim 1, further comprising: training a machine learning algorithm using existing application logic graphs; and suggesting, by the trained machine learning algorithm, modifications to improve efficiency of the application logic graph.

3. The method of claim 1, further comprising implementing, by the user interface design studio, a visual flow language to model application logic flows and state through UI call streams.

4. The method of claim 1, further comprising: receiving a natural language query describing a desired task for the user interface application; and generating, based on the natural language query, a suggested application logic graph using the components and connections.

5. The method of claim 1, further comprising: providing a preview of the user interface application in a preview panel of the user interface design studio.

6. The method of claim 1, further comprising: receiving user input defining breakpoints in the application logic graph; and executing the user interface application in a debug mode that pauses execution at the defined breakpoints.

7. The method of claim 1, further comprising the respective nodes retrieving, based on the data mapping, data responsive to call streams to enable non-linear execution of application logic.

8. A non-transitory computer-readable storage medium for tangibly storing computer program instructions capable of being executed by a computer processor, the computer program instructions defining steps of:

receiving, via a user interface design studio, a user selection of components from a component catalog, wherein the components comprise at least one of user interface (UI) components, data components, logical components, and transform components;

displaying the selected components in a flow panel of the user interface design studio;

receiving user input to define connections between nodes of the selected components, wherein the connections comprise call streams and data mappings;

generating an application logic graph based on the selected components and defined connections; and creating a user interface application based on the application logic graph.

9. The non-transitory computer-readable storage medium of claim 8, the steps further comprising: training a machine learning algorithm using existing application logic graphs; and suggesting, by the trained machine learning algorithm, modifications to improve efficiency of the application logic graph.

10. The non-transitory computer-readable storage medium of claim 8, the steps further comprising implementing, by a user interface design studio, a visual flow language to model application logic flows and state through UI call streams.

11. The non-transitory computer-readable storage medium of claim 8, the steps further comprising: receiving a natural language query describing a desired task for the user interface application; and generating, based on the natural language query, a suggested application logic graph using the components and connections.

12. The non-transitory computer-readable storage medium of claim 8, the steps further comprising: providing a preview of the user interface application in a preview panel of the user interface design studio.

13. The non-transitory computer-readable storage medium of claim 8, the steps further comprising: receiving user input defining breakpoints in the application logic graph; and executing the user interface application in a debug mode that pauses execution at the defined breakpoints.

14. The non-transitory computer-readable storage medium of claim 8, the respective nodes retrieving, based on the data mapping, data responsive to call streams to enable non-linear execution of application logic.

15. A device comprising:

a processor; and a storage medium for tangibly storing thereon program logic for execution by the processor, the program logic comprising steps for:

receiving, via a user interface design studio, a user selection of components from a component catalog, wherein the components comprise at least one of user interface (UI) components, data components, logical components, and transform components;

displaying the selected components in a flow panel of the user interface design studio;

receiving user input to define connections between nodes of the selected components, wherein the connections comprise call streams and data mappings;

generating an application logic graph based on the selected components and defined connections; and creating a user interface application based on the application logic graph.

16. The device of claim 15, further comprising: training a machine learning algorithm using existing application logic graphs; and suggesting, by the trained machine learning algorithm, modifications to improve efficiency of the application logic graph.

17. The device of claim 15, the steps further comprising implementing, by the user interface design studio, a visual flow language to model application logic flows and state through UI call streams.

18. The device of claim 15, further comprising: receiving a natural language query describing a desired task for the user interface application; and generating, based on the natural language query, a suggested application logic graph using the components and connections.

19. The device of claim 15, further comprising: providing a preview of the user interface application in a preview panel of the user interface design studio.

20. The device of claim 15, further comprising: receiving user input defining breakpoints in the application logic graph; and executing the user interface application in a debug mode that pauses execution at the defined breakpoints.

* * * * *